July 6, 1943.   W. E. ENNS   2,323,588
APPARATUS FOR A-C NETWORK ANALYSIS
Filed Nov. 6, 1940   12 Sheets-Sheet 1

INVENTOR.
WALDO E. ENNS.
BY Lippincott + Metcalf
ATTORNEYS.

INVENTOR.
WALDO E. ENNS.
BY Lippincott + Metcalf
ATTORNEYS.

July 6, 1943.   W. E. ENNS   2,323,588
APPARATUS FOR A-C NETWORK ANALYSIS
Filed Nov. 6, 1940   12 Sheets-Sheet 9

INVENTOR.
WALDO E. ENNS.
BY Lippincott + Metcalf
ATTORNEYS.

July 6, 1943.  W. E. ENNS  2,323,588
APPARATUS FOR A-C NETWORK ANALYSIS
Filed Nov. 6, 1940   12 Sheets-Sheet 10

INVENTOR.
WALDO E. ENNS.
BY Lippincott + Metcalf
ATTORNEYS.

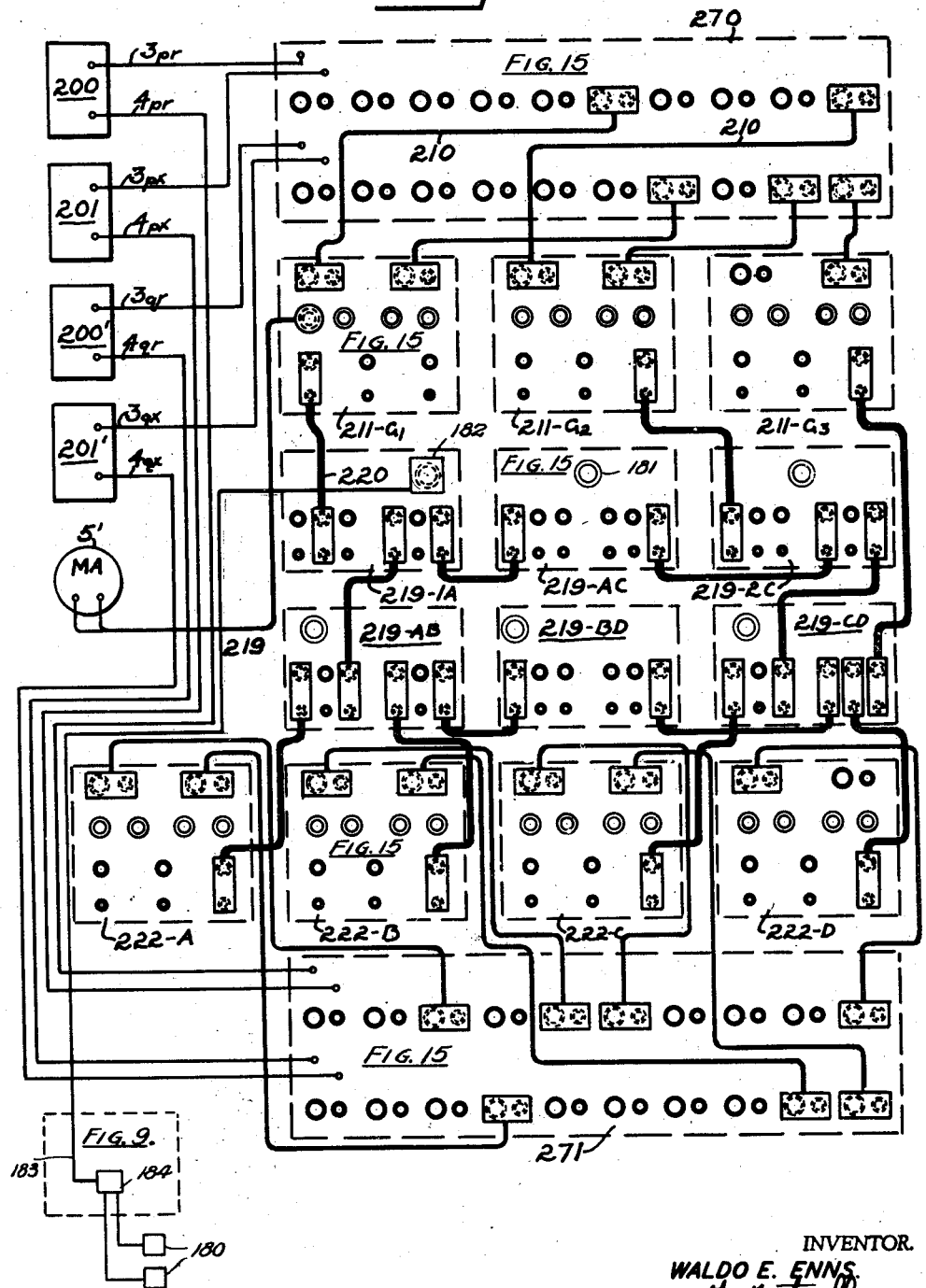

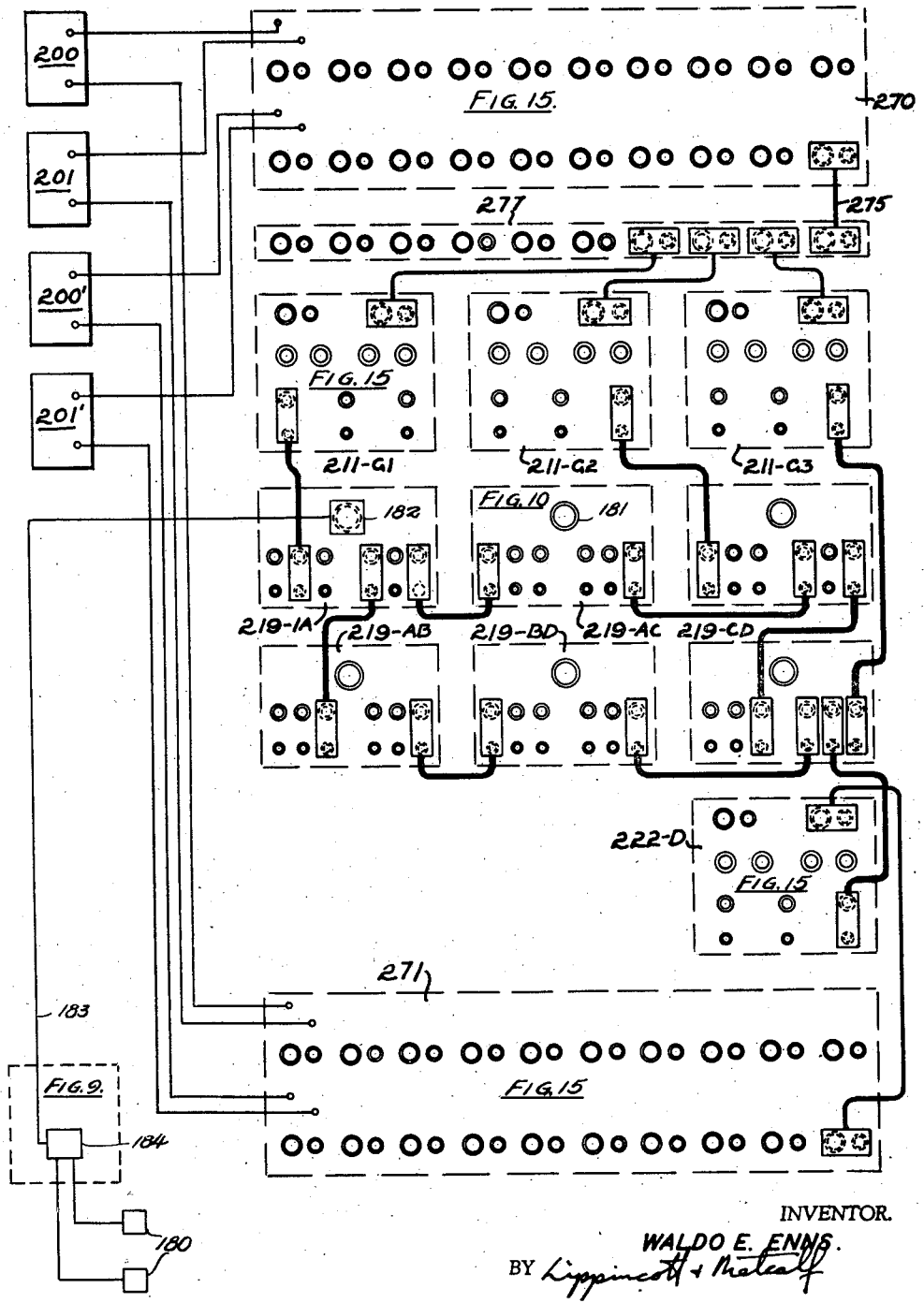

Patented July 6, 1943

2,323,588

UNITED STATES PATENT OFFICE 2,323,588

APPARATUS FOR A. C. NETWORK ANALYSIS

Waldo E. Enns, Portland, Oreg.

Application November 6, 1940, Serial No. 364,559

6 Claims. (Cl. 235—61)

This invention relates to the analysis of the operating and short-circuit characteristics of alternating current distribution networks, and particularly to a method and apparatus for making complete analyses of these characteristics, including the determination of both power and reactive components of voltage and current through the use of direct current elements and instruments only.

Experience has proved that alternating current distribution systems can be operated much more efficiently, both as to reduction of losses and as to maintenance of service, where those systems are connected as networks rather than radially. Such network operation, however, involves a number of problems which do not appear where a simple radial distribution system is used. The computation of a radial system is a comparatively simple matter, given the loads to be supplied and the line characteristics. With a network, however, even if the network be relatively simple, the computation or analysis of its performance under varying conditions of load or of short circuit, may become extremely complex, and this complexity increases enormously with the addition of more generating points, load points, and tie lines, so that the determination of currents, voltage drops, and phase angles in the various links by purely analytical methods becomes a practical impossibility. If a network is to give satisfactory service from the standpoints of the stability of operation and of the maintenance of proper voltages at distribution points while supplying loads of various characteristics, these things should be known.

The computation is so complex, however, that the ordinary practice in designing a network or in extending an existing network is to base the design almost entirely upon judgment derived from past experience, with a few rough calculations which indicate in a general way what the performance will be. Fortunately, where sound judgment is used, these methods will usually lead to fairly satisfactory results. Where they fail to do so, however, the failure is extremely costly, and therefore satisfactory means of mechanical computation has been earnestly sought for.

Two principal forms of such devices have been developed. The first, and simplest, is the "D. C. computing board" or table, which is satisfactory only for analysis of short-circuit conditions, and wherein the network is simulated by resistors whose ohmic values are proportional to the ohmic values of the corresponding links of the actual network which is to be analyzed, including with such links the reactance of the generator or generators supplying the network. When this simulated network is supplied with a voltage or voltages proportional to those supplied by the generating apparatus and the voltage drops are measured, the distribution of these drops across the various links gives approximately the distribution of the drops throughout the actual network, and by applying proper proportional factors to the results thus obtained the voltages and currents obtaining in the network under the conditions simulated may be obtained. The boards are ordinarily constructed and operated on a single phase basis, i. e., the voltages applied are those between neutral and one phase of the network, and the simulated circuits comprise only resistors representing the reactance of one leg of the net, the other two legs of the three-phase network being replaced by a bus of negligible impedance representing the neutral or ground.

The second type of computing device is also ordinarily constructed on a single phase basis, but in this case the network is electrically substantially a duplicate in miniature of the actual network, with reactances and resistances representing and proportional to the reactances and resistances of the links thereof. Alternating currents are supplied to such a network at those points where generators are actually located, and the loads are also represented by resistance-reactance combinations similarly proportional to the actual loads. With such a network the voltage drops across each link and the current flowing in the links can be measured directly, and, again by utilizing the proper factors of proportionality, the performance of the actual network can be predicted with as high a degree of accuracy as may be required, particularly if successive approximations and corrections be made. Such "A. C. boards" are obviously greatly superior to the "D. C. computing boards," in that they give complete information as to the performance of the network under any set of circumstances. Their disadvantage is, however, that they are enormously expensive, the cost, of course, increasing with the number of links, generators, and loads to be simulated. Such a device, built for the Bonneville Electric Project, with provisions for the simulation of nine generators and a correspondingly large and flexible network and load system, cost in the neighborhood of $80,-000.00. It is clear that in many instances such costs would be prohibitive, but the value of the information supplied by such equipment is indicated by the fact that there are a number of such computing boards or analyzers in use, and that where they are used they are deemed to be well worth the prices paid.

The primary object of this invention is to provide a method and apparatus for analyzing the performance of distributing networks which is of such character that the apparatus may be constructed at approximately one-tenth the cost of the systems heretofore used for giving complete analyses. More specifically, among the objects of the invention are to provide an analyzing device using only direct current components, such as resistors and meters, whereby a complete analysis may be obtained; to provide a device wherein the resistance and reactance components of a network may both be represented by resistances in a simulated network, from which measurements may be obtained giving the values directly of both power and reactive components of both current and voltage in the network, and also of the total vector voltage and current in any portion of the system and for the system as a whole; to provide a method of and apparatus for network analysis which will, with a small number of successive approximations, give all of the desired information as to currents, voltages, and phase angles of a network to as great a degree of accuracy as may be desired; to provide methods and apparatus whereby, through the medium of direct current only, values equivalent to algebraic and vector additions of alternating current quantities may be obtained; and to provide a computing or analyzing device for alternating current networks which is sufficiently low in cost, simple in construction, and flexible in use to warrant its construction to meet the demands of analysis of any system however complex, and utilization in the design and extension of practically any alternating current network.

My invention possesses numerous other objects and features of advantage, some of which, together with the foregoing, will be set forth in the following description of specific apparatus embodying and utilizing my novel method. It is therefore to be understood that my method is applicable to other apparatus, and that I do not limit myself, in any way, to the apparatus of the present application, as I may adopt various other apparatus embodiments, utilizing the method, within the scope of the appended claims.

The method and apparatus of this invention are based on the fact that the voltage drops in any link of a network are expressed by the equation $$V = V_p + jV_q = (I_pR - I_qX) + j(I_qR + I_pX)$$

where R and X represent respectively the resistance and reactance of the link, and V and I the voltage drops and currents therein, with the subscripts $p$ and $q$ denoting the in-phase and quadrature components of these quantities as referred to some common reference vector. The total voltage drop therefore comprises two quantities which must be added vectorially, and each of these quantities is itself comprised of two quantities added algebraically.

Each of the four quantities which go to make up the complete expression is dimensionally the same, and the prototype of each is the drop produced by a direct current through a resistance, i. e., if an alternating current flows through a purely resistive circuit the drop produced is numerically equal to that produced by a direct current of the same amperage flowing in the same resistance. If the alternating current flows through a reactance of the same ohmic value the drop will again be the same numerically, although considered vectorially it will be in quadrature.

It is therefore possible, by causing direct currents which are numerically equal to $I_p$ and $I_q$ to flow through resistances which are numerically equal to R and X, to measure across these resistances voltage drops which are numerically equal to each of the four quantities $I_pR$, $I_qX$, and $I_qR$ and $I_pX$, which enter into the complete expression for V. Adding the first two of these quantities, with proper regard for signs will give the total numerical value for the in-phase drop $V_p$, while adding the other two quantities in like manner will give the quadrature drop $V_q$. For most purposes of analysis it is desirable that these drops be considered and handled separately, but where the numerical value of the total impedance volts drop is required it may easily be obtained by the expression $V = \sqrt{V_p^2 + V_q^2}$.

Considered from the aspect of method, the invention comprises broadly the formulation of two purely resistive networks wherein each link has an ohmic value proportional to one of the two components of impedance in the actual network, so that one of the networks thus formulated represents the reactances only of the actual network while the other represents the resistances only of said network. Current is supplied to each of these networks at points corresponding to each generator position on the actual network, this current being in each case proportional to one of the two components supplied in quadrature by the generators of the actual network, while currents corresponding to the other of these two components are similarly supplied to the other network. Currents proportional respectively to the corresponding components of the loads on the actual network are withdrawn from the networks at points corresponding to that at which the actual network is loaded. (It is recognized that the use of the terms "supplied" and "withdrawn" as applied to current are subject to criticism, since it is actually supplied in both instances. It is believed, however, that the meaning is perfectly clear, and that the relative simplicity of expression achieved by this terminology justifies the use of these words which in the strict sense apply only to the power which the current represents.) Under these circumstances there will be currents flowing in each link of each of the two networks, which will produce voltage drops, and the sum of the voltage drops in the two links which correspond to any one link of the actual network will be substantially equal to one component of the voltage drop in the actual network as above set forth. If the ratio of resistance to reactance is substantially the same in each link of the network the result will be exact, but even if there be a wide difference in resistance-reactance ratios within the network it may be shown that the correspondence will be reasonably close. A similar procedure is then carried out with the power and reactive components of current interchanged as between the two networks to obtain the other quadrature voltage drop components, which are applied to the known or assumed potential components at the point chosen as the reference for the system, and the two components thus obtained are added vectorially to obtain total voltages throughout the system, and from which network losses, reactive KVA, and phase angles throughout the network may be obtained.

Where the resistance-reactance ratios of the various links differ widely the currents flowing in the various links are computed from the voltage drop and the impedance of the links, the differences between the currents flowing to and from the load points are applied as corrections and the process repeated to give a substantially exact solution comparable corrections being made as to voltage if warranted.

From the aspect of apparatus the device comprises resistance units for simulating the various links, means for connecting such units into the simulated networks, means for adjusting the input currents and load currents to desired values, such means preferably comprising current-limiting devices, means for measuring the current supplied to and withdrawn from each of two simulated networks, means for measuring the voltages across each link, and means comprising meters having two electrically separated windings for adding algebraically the voltage in the respective links. There are preferably provided the elements thus far recited for four simulated networks, two corresponding to reactance and two to resistance of the actual network, with current-limiting generator- and load-units for supplying and withdrawing the resistance component current to one of the reactive networks and one of the resistance networks and a reactive component current to the other reactive network and the other resistive network, and a meter is also preferably provided having two input circuits, each having a square law response and connected to a single index means which is calibrated in terms of the quantity to be measured for indicating the scalar value of the total vector voltage drops throughout the system.

The nature of the invention may be better appreciated from the following detailed description of certain embodiments thereof, taken in connection with the accompanying drawings, wherein:

Fig. 16 is a block diagram showing the complete connection of units as illustrated diagrammatically in Fig. 15 to analyze the network of Fig. 1.

Fig. 17 is a similar block diagram showing the complete connection of units for a four-circuit network analyzer as connected for analysis of the short-circuit condition illustrated in Fig. 2.

It is believed that the present invention can best be understood through a consideration of its application to a specific analysis problem. To this end there is shown schematically in Fig. 1, one phase of a distribution network of a type such as would frequently be met with in practice. The particular network chosen is one which is sufficiently complex to illustrate the value and flexibility of the system, while not too complex to permit of mathematical analysis, so that the results which would be obtained through the method and the apparatus of the invention may be checked and the degree of approximation and the magnitude of any errors involved may be shown. For simplicity of treatment this network is shown on a single phase basis; i. e., as one leg of a balanced three-phase network with grounded neutral. Methods of accounting for unbalance will be indicated later, and it will be realized that in the case of an ungrounded system the other phases are the complete equivalent of the ground here considered, due account being taken of the voltage of these other phases to the theoretical neutral point.

Figure 1:
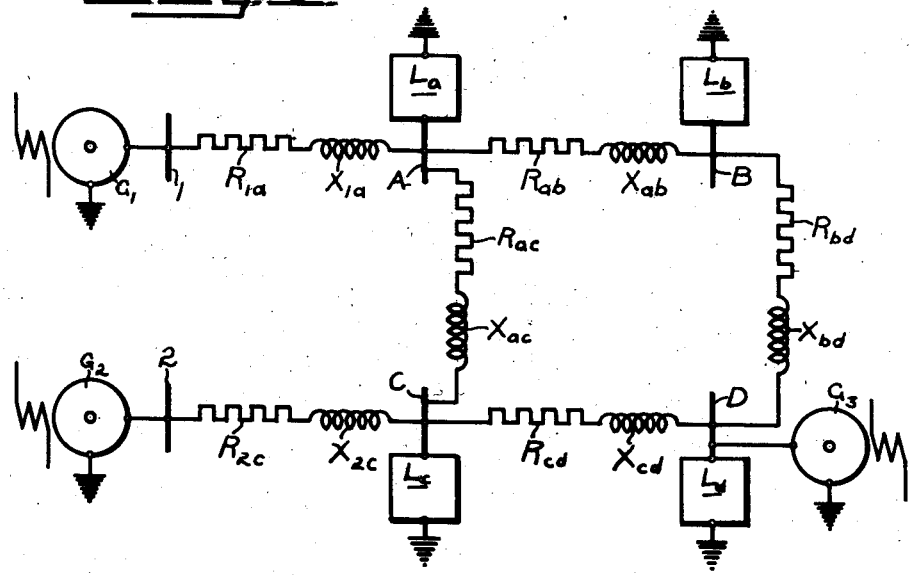
Fig. 1 is a schematic impedance diagram of one phase (neutral to ground) of an actual balanced three-phase network.

The assumed network, shown symbolically in Fig. 1, operates at a normal voltage to neutral of 33,333 volts or 33.333 KV. It includes two generators $G_1$ and $G_2$, each feeding its corresponding bus 1 and 2 respectively. In practice, of course, each of the supplies thus symbolically shown might comprise a group of generators feeding the bus, but so far as the network is concerned the single generator is a complete equivalent.

The network is assumed to supply four loads connected to buses A, B, C and D respectively, and for convenience in notation the loads themselves are designated by the reference character L with subscripts denoting the buses, i. e., $L_a$, $L_b$ etc. The balanced three-phase real and reactive power requirements at the four load-buses are assumed to be as follows:

Tabulation 1

Bus A  5,000 KW and 5,000 KVAR lagging.
Bus B  3,000 KW and 6,500 KVAR lagging.
Bus C  2,000 KW and 1,500 KVAR lagging.
Bus D  6,000 KW and 1,000 KVAR leading.

The load connected to bus D includes a synchronous condenser $G_3$, which accounts for the net load supplied to this bus having a leading power factor. The approximate power and reactive KVA supplied at the generator buses is assumed to be as follows:

Tabulation 2

Bus 1 10,000 KW and 10,000 KVAR lagging.
Bus 2 6,000 KW and 2,000 KVAR lagging.

The impedances of the various links of the network are assumed to be as follows, the subscripts indicating the buses connected by the various links:

Tabulation 3

$Z_{1a} = R_{1a} + jX_{1a} = 5 + j\ 10$ ohms to neutral,
$Z_{ab} = R_{ab} + jX_{ab} = 6 + j\ 18$ ohms to neutral,
$Z_{ac} = R_{ac} + jX_{ac} = 4 + j\ 16$ ohms to neutral,
$Z_{bd} = R_{bd} + jX_{bd} = 3 + j\ 3$ ohms to neutral,
$Z_{2c} = R_{2c} + jX_{2c} = 1 + j\ 1$ ohms to neutral,
$Z_{cd} = R_{cd} + jX_{cd} = 10 + j\ 50$ ohms to neutral.

These values are purposely chosen as having widely different resistance to reactance ratios, in order to illustrate the methods of correcting the errors introduced by such factors and to show the closeness of the approximation arrived at even when such corrections are not made. In the figure the designations $R_{1a}$, $X_{1a}$ etc. are used as reference characters to identify the constants of the links.

At the start of an analysis of this character the only quantities which are known definitely are the power and reactive kilovolt amperes to be supplied to the various loads. The currents representing this power are dependent upon the voltages at the respective buses and these, again, depend upon the voltage drops throughout the system. Under the assumptions already made it is, strictly speaking, possible to assume and assign a definite voltage to only one of the buses in the system. However, as a first approximation, a common voltage vector $$E = 33.333 + j0\ KV$$

is assumed to exist between each of the buses and neutral. With this assumed as a common reference vector it is possible to compute approximately the current at each of the buses; i. e., at each of the generators and load points. At any of these points the in-phase component of current $$I_p = \frac{E_p P - E_q Q}{E_p^2 + E_q^2}$$

where P is the single phase power and Q the single phase KVAR, and the out-of-phase component of current $$I_q = \frac{E_p Q + E_q P}{E_p^2 + E_q^2}$$

Owing to the choice made of reference vector, however, the quantity $E_q$ is zero, and these equations simplify to $$I_p = \frac{P}{E_p} = \frac{P}{33.333} = \frac{3P}{100}$$

and $$I_q = \frac{Q}{E_p} = \frac{Q}{33.333} = \frac{3Q}{100}$$

Therefore, for the first approximate solution of the network, the power and quadrature components of the current at each bus are taken equal in numerical value to 1/100 of the kilowatts and KVAR respectively at that bus. The currents, considered as flowing into and out of the network at the various buses, are therefore as follows: the subscripts indicating the bus at which the current is measured:

Tabulation 4

$I_1 = (I_p)_1 + j(I_q)_1 = 100 - j\ 100$ amperes into network
$I_2 = (I_p)_2 + j(I_q)_2 = 60 - j\ 20$ amperes into network.
$I_a = (I_p)_a + j(I_q)_a = 50 - j\ 50$ amperes from network to load A.
$I_b = (I_p)_b + j(I_q)_b = 30 - j\ 65$ amperes from network to load B.
$I_c = (I_p)_c + j(I_q)_c = 20 - j\ 15$ amperes from network to load C.
$I_d = (I_p)_d + j(I_q)_d = 60 + j\ 10$ amperes from network to load D.

Figure 3:
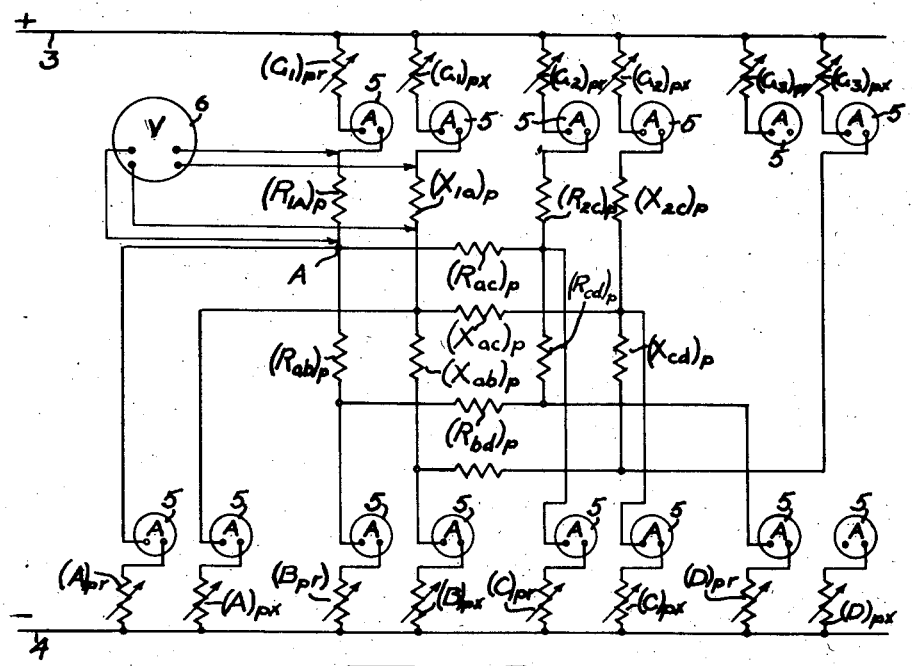
Fig. 3 is a schematic diagram of a simulated network for determining the in-phase component of voltage drop in the actual circuit of Fig. 1.
Figure 4:
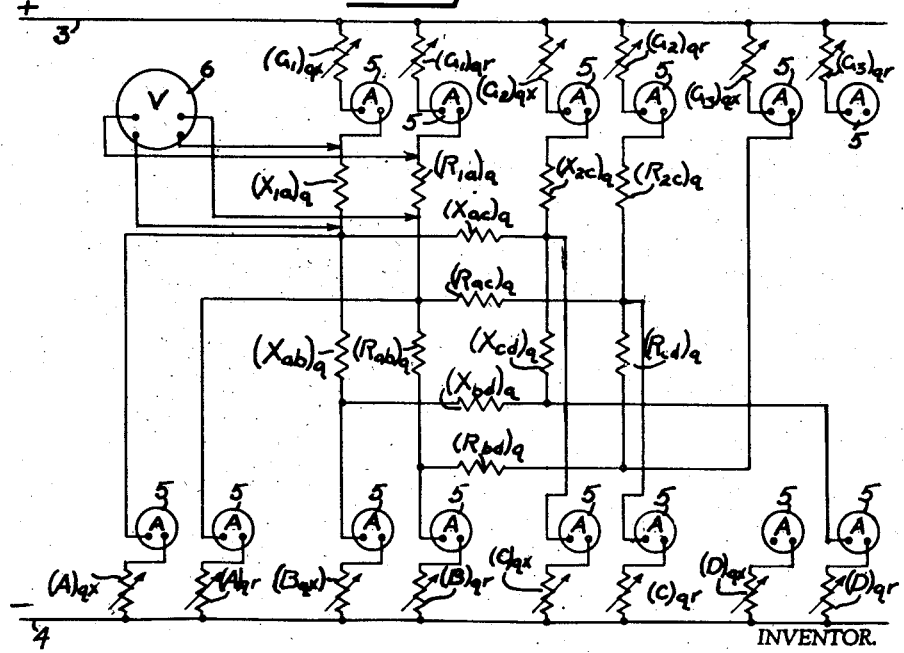
Fig. 4 is a similar schematic diagram of the simulated networks for obtaining the out-of-phase or quadrature component of voltage drop in the circuit of Fig. 1.

The various data thus derived are approximately those necessary for the analysis of the network by any of the known methods, and having them in hand the next step in the method of my invention is to set up simulated networks consisting wholly of resistance elements, plus D. C. meters, as illustrated in Figs. 3 and 4. These figures show in schematic form the circuits used in their simplest physical aspect, although from the point of view of manipulation such circuits would be much more difficult to handle and adjust than certain refined forms which will be described hereinafter. The networks of Fig. 3 are those used to determine the in-phase component of the voltage drop, while those of Fig. 4 determine the out-of-phase or quadrature components. The simulated networks are set up between a pair of leads or buses 3 and 4, between which a D. C. potential is maintained which is somewhat greater than is necessary to pass the required current through the respective simulated networks.

In order to show the relationship between the simulated and actual networks, the various elements of the simulated networks are designated by the same reference characters used to designate the corresponding elements of the actual network of Fig. 1, these reference characters, however, being enclosed in parentheses and the parentheses are themselves distinguished by subscripts. In thus designating the elements the subscript $p$ indicates that the simulated element is comprised in the network used to determine the in-phase component of voltage drop, and the subscript $r$ that the network is the one wherein the portion of the voltage drop determined is that occurring across the resistance. Similarly the subscript $q$ indicates a network wherein the quadrature components of voltage drop are measured, and the subscript $x$ indicates that the portion of the voltage drop measured is that occurring across the reactance of the circuits. Thus the elements $(G_1)_{pr}$ is that used to simulate the generator $G_1$ in the network measuring the power component of the voltage drop which occurs across the resistances in the network, while $(G_1)_{px}$ simulates the same generator in the network wherein the portion of the in-phase voltage drop is developed which is due to the quadrature current in the reactances of the network.

The simulated generators in each network comprise a current-limiting or regulating device, which is shown in the two figures under consideration as an adjustable rheostat. With each of these is associated an ammeter, or, preferably, a milliammeter 5 for measuring the current fed into the network through that specific rheostat. Since in practice a single milliammeter is preferably used for all measurements, being jacked into the circuit to be measured, the same reference character is used on all milliammeters indicated. The synchronous condenser $G_3$ feeds only quadrature current into the network, and hence no circuit is connected to the simulated generator element $(G_3)_{pr}$ and its associated milliammeter.

The simulated loads $(A)_{pr}$, $(A)_{px}$, $(B)_{pr}$, etc., are similar to the simulated generators in all respects, each having its associated milliammeter (or milliammeter connection) 5.

Connected between the generators and loads designated by the subscript $pr$ is a network similar in form to that of Fig. 1, wherein the elements are all resistors whose ohmic values are proportional to those of the resistance components in the corresponding links of the actual network. It is not generally desirable that these values be made equal to those in the actual net, since this would require heavy currents and large capacity resistors in the analyzing system. It is sufficient if all links have a common factor of proportionality, for example, if each link has one thousand times the resistance of the corresponding actual link. Under these circumstances the currents supplied between the buses 3 and 4 can be made 1/1,000 those flowing in the actual network, and with one milliampere thus representing one ampere of actual current the voltage drops will be the same as those in the actual net. It is not, of course, necessary that the same factors be used for increasing the impedance values and decreasing the current values, since it is obvious that a correction factor can be used on the voltage measurements as well as those of current or resistance. The factor of 1,000 is convenient, however, and throughout the remainder of this discussion it will be assumed that it is used.

The generators and loads designated by the subscript $px$ are similarly connected with resistances whose ohmic values are proportional to the ohmic values of reactance in the actual network in the same ratios as is used in proportioning the resistances. As above stated, these resistance elements are designated by the same reference characters used for the corresponding quantities in the impedance diagram of Fig. 1. It should be pointed out, however, that $(X_{1a})_p$ for example is a reference character, and that the element that it designates is in fact a pure resistance element and not an inductance.

Because the purpose of the set-up is to add the components of voltage drops of like phase, and because a quadrature component of voltage drop conventionally designated as a negative quantity produces a positive voltage drop in an inductive circuit, i. e., $-jI \times jX = IX$ and hence a drop in the same sense as is produced through a resistance by the power component — the currents through the simulated generators which supply reactive component currents are considered as negative in sign, although the flow is in the same direction through the network from bus 3 to bus 4 as is the positive flow through the resistance simulating network. This convention is followed throughout the system, and will be assumed to be understood in the remainder of this specification.

It should further be noted that the load D withdraws no reactive power from the line, and that the simulated load unit $(D)_{px}$ is therefore not connected to the corresponding bus, its place being taken by the simulated generator unit $(G_3)_{px}$. A static capacitive load, which would supply current in the same sense would be similarly connected. Aside from this it is believed that no difficulty will be experienced in following out the two networks of Fig. 3.

Fig. 4 is nearly identical with Fig. 3, except that it represents the circuits utilized for measuring the quadrature components of the voltage drop, and therefore each of the simulated elements shown is distinguished by the subscript $q$. Because of the substantial identity of the figures in other respects it is believed unnecessary to repeat the description. In the actual set-up the simulated networks are preferably connected to the same buses 3 and 4 as the circuits of Fig. 3.

With the circuit set up, the simulated generators and loads can now be adjusted so that each passes the proper current, proportional to that indicated in Tabulation 4. Thus simulated generator $(G_1)_{pr}$ is adjusted so that milliammeter 5 reads 100 milliamperes, corresponding to the real component $(I_1)_p = 100$ amps. Simulated generator $(G_1)_{px}$ is likewise set so that milliammeter 6 reads 100, corresponding to $(-I_1)_q$. In like manner simulated load $(B)_{pr}$ is set to read 30 milliamperes, while $(B)_{px}$ is set to read 65 milliamperes, these two settings together corresponding to $$I_b = (I_b)_p + j(I_b)_q = 30 - j\,65 \text{ amperes}$$

Means are provided for measuring the in-phase drop across the corresponding links of the circuit simultaneously and indicating their algebraic sums. As shown in Fig. 3 this comprises a voltmeter 6 of the permanent magnet type, such as a D'Arsonval meter, having two electrically separate windings actuating the same movement. Each of these windings produces a force which is directly proportional to the voltage effective across its terminals, and these forces act together to cause the meter deflection, which is proportional to their sum if they act in the same direction and to their difference if they be opposed; i. e., the deflection is proportional to the algebraic sum and the meter therefore reads the in-phase voltage drop which would be effective across the corresponding link of the actual circuit under the conditions assumed.

Similar conditions hold in the measurement of the quadrature component of voltage drop accomplished on the circuit shown in Fig. 4, and since, in practice, the same meter would probably be used in making both sets of measurements the voltmeter 6 is given the same reference character in both figures. The power component $I_p$, flowing in the inductive reactance of a circuit, however, produces a voltage drop which is conventionally designated as positive, while the reactive component $-jI_q$ in the resistance of the circuit produces a drop of opposite sense. The voltmeter connections to the $(R)_q$ elements of the network are therefore reversed in order to give the proper relationships as to sign to the two voltage components added by the meter and cause it to read the total quadrature drop.

It will be noted that of the four networks set up in the analysis there are two, one shown in each of the two Figs. 3 and 4, which are identical insofar as their resistance values are concerned, each representing the resistances of the actual network, and two similarly identical networks, one in each figure, representing the reactance values. There is also, in each network, a simulated generator or load which carries the same current as that of a simulated generator or load in the other network, but in the two set-ups for measuring in-phase and quadrature components the simulated generators are interchanged as between those of the similar networks shown in the other figure.

In the present instance the voltage drops measured will be those shown in the following tabulations, Tabulation 5 showing the in-phase voltage drop in the various links of the system, while Tabulation 6 shows the quadrature voltage drops in the various links, it being borne in mind that all of the quantities are D. C. quantities, that $X_p$ and $X_q$ are in fact resistances, and hence the operator $j$ does not appear:

$E_d = [(E_b)_p + j(E_b)_q] - [(V_{bd})_p + j(V_{bd})_q] =$
$(32,248 - j869) - (-1 + j168) = 32,249 - j1037$ volts;

$E_c = [(E_d)_p + j(E_d)_q] + [(V_{cd})_p + j(V_{cd})_q] =$
$(32,249 - j1037) + (980 + j1263) = 33,229 + j266$ volts;

$E_2 = [(E_c)_p + j(E_c)_q] + [(V_{2c})_p + j(V_{2c})_q] =$
$(33,229 + j226) + (80 + j40) = 33,309 + j266$ volts;

$E_a = [(E_c)_p + j(E_c)_q] - [(V_{ca})_p + j(V_{ca})_q] =$
$(33,229 + j226) - (-104 + j227) = 33,333 - j1$ volts.

The final computation in this tabulation of the value of vector $E_a$, is, of course, made merely as a check, and the value thus found differs negligibly from the assumed reference vector, i. e., the check around the network is shown to be extremely close.

*Tabulation 5*

| Link | $I_{pr}$ | $(R)_p$ | $I_{pr}(R)_p$ | $-I_{qs}$ | $(X)_p$ | $-I_{qs}(X)_q$ | $(V)_p = I_{pr}(R)_p - I_{qs}(X)_p$ |
|---|---|---|---|---|---|---|---|
| 1A | +100.00 | 5 | +500.00 | +100.00 | 10 | +1000.00 | +1500.00 |
| AB | +51.74 | 6 | +310.44 | +43.05 | 18 | +774.90 | +1085.34 |
| BD | +21.74 | 3 | +65.22 | −21.95 | 3 | −66.85 | −0.63 |
| 2C | +60.00 | 1 | +60.00 | +20.00 | 1 | +20.00 | +80.00 |
| CD | +38.26 | 10 | +382.60 | +11.95 | 50 | +597.50 | +980.10 |
| CA | +1.74 | 4 | +6.96 | −6.95 | 16 | −111.20 | −104.24 |

*Tabulation 6*

| Link | $I_{qr}$ | $(R)_q$ | $I_{qr}R_q$ | $I_{ps}$ | $(X)_q$ | $I_{ps}(X)_q$ | $(V)_q = I_{qr}R_q + I_{ps}(X)_q$ |
|---|---|---|---|---|---|---|---|
| 1A | −100.00 | 5 | −500.00 | +100.00 | 10 | +1000.00 | +500.00 |
| AB | −41.09 | 6 | −246.54 | +61.95 | 18 | +1115.10 | +868.56 |
| BD | +23.91 | 3 | +71.73 | +31.95 | 3 | +95.85 | +167.58 |
| 2C | −20.00 | 1 | −20.00 | +60.00 | 1 | +60.00 | +40.00 |
| CD | −13.91 | 10 | −139.10 | +28.05 | 50 | +1402.50 | +1263.40 |
| CA | +8.91 | 4 | +35.64 | +11.95 | 16 | +191.20 | +226.84 |

By inspection it will be seen that the potential of bus A represents very nearly the average potential of the system, and the reference vector originally assumed is taken to apply at this point. The voltage drops measured, being quite closely approximate to the true voltage drops in the system, are applied successively in proper sense from the point A to find the approximate voltage from each of the buses to neutral, the computation being as follows:

*Tabulation 7*

$E_a$ = Reference vector $E = (E_a)_p + j(E_a)_q =$
$33,333 + j0$ volts;

$E_1 = (E_1)_p + j(E_1)_q = [(E_a)_p + j(E_a)_q] +$
$[(V_{1a})_p + j(V_{1a})_q] = (33,333 + j0) + (1500 + j500) =$
$34,833 + j500$ volts;

$E_b = [(E_a)_p + j(E_a)_q] - [(V_{ab})_p + j(V_{ab})_q] =$
$(33,333 + j0) - (1085 + j869) = 32,248 - j869$ volts;

The next determination to be made is that of the current flowing in the various links of the circuit, and these values may be determined from the voltage drops $(V)_p$ and $(V)_q$ and the impedance of the links. The power components of current $I_p = G(V)_p + B(V)_q$, where G and B are the conductance $$G = \frac{R}{R^2 + X^2}$$

and susceptance, $$B = \frac{X}{R^2 + X^2}$$

Similarly quadrature current components are derived from the equation $I_q = G(V_q) - B(V)_p$. These values in the example under consideration are as follows:

*Tabulation 8*

| Link | G | $(V)_p$ | $G(V)_p$ | B | $(V)_q$ | $B(V)_q$ | $I_p = G(V)_p + B(V)_q$ |
|---|---|---|---|---|---|---|---|
| 1A | .04 | +1500. | +60. | .08 | +500. | +40. | +100. |
| AB | .01667 | +1085.34 | +18.1 | .05 | +868.56 | +43.43 | +61.53 |
| BD | .1667 | −0.63 | −.105 | .1667 | +167.58 | +27.93 | +27.82 |
| 2C | .5 | +80. | +40. | .5 | +40. | +20. | +60. |
| CD | .00384 | +980.1 | +3.8 | .0192 | +1263.4 | +24.3 | +28.1 |
| CA | .0147 | −104.24 | −1.533 | .0588 | +226.84 | +13.35 | +11.82 |

*Tabulation 9*

| Link | G | $(V)_q$ | $G(V)_q$ | B | $(V)_p$ | $-B(V)_p$ | $I_q = G(V)_q - B(V)_p$ |
|---|---|---|---|---|---|---|---|
| 1A | .04 | +500. | +20. | .08 | +1500. | −120. | −100. |
| AB | .01667 | +868.56 | +14.48 | .05 | +1085.34 | −54.27 | −39.79 |
| BD | .1667 | +167.58 | +27.9 | .1667 | −0.63 | +0.105 | +28. |
| 2C | .5 | +40. | +20. | .5 | +80. | −40. | −20. |
| CD | .00384 | +1263.4 | +4.85 | .0192 | +980.1 | −18.83 | −14. |
| CA | .0147 | +226.84 | +3.33 | .0588 | −104.24 | +6.13 | +9.46 |

By adding the current components as thus found flowing in each of the links connected to each of the load buses we may obtain a check on the values of current flowing to the various loads. If the ratio of resistance to reactance were the same in each link of the circuit, i. e., if all of the links were open wire lines or all of the links were cable, and all, in either case, of similar construction, the check would be exact. Since, however, the resistance-reactance ratio was purposely assumed to vary as between the links, the checks will not be exact, and the following table gives the assumed values, the values computed by adding the link components, and the differences:

*Tabulation 10*

| Load | $I_p$ (assumed) | $I_p$ (computed) | $I_q$ (assumed) | $I_q$ (computed) | $\Delta I_p$ | $\Delta I_q$ |
|---|---|---|---|---|---|---|
| A | 50 | 50.3 | −j50 | −j50.74 | +0.3 | −j.74 |
| B | 30 | 33.7 | −j65 | −j67.8 | +3.7 | −j2.8 |
| C | 20 | 20.1 | −j15 | −j15.46 | +.1 | −j0.46 |
| D | 60 | 55.9 | +j10 | +j14.0 | −4.1 | +j4.0 |

From the data thus derived it is possible to obtain all of the data ordinarily desired in a network analysis, i. e., the approximate voltage and phase angle at each bus, the approximate current flowing in each link and to the various loads, and the approximate power and reactive KVA supplied to each of the loads. Without giving the detailed computations by which these quantities are arrived at, the following values are obtained, the assumed values being tabulated for comparison.

rents around the network, repeating the operation enough times to obtain a picture of network characteristics under substantially all load conditions, interpolating between the values actually determined to obtain the values at intermediate conditions.

There are, however, occasions when it is necessary or desirable to have a solution for a definite predetermined load condition, and such a solution may be obtained by applying proper corrections, as determined from the approximate solution as above obtained, to the assumed values of load and generator currents and voltages, and repeating the analysis as follows:

Using the new bus voltages as tabulated in Table 7, the power and reactive components of the current supplied to each load are again determined. These currents are derived from the equations $$I_p = \frac{E_p P - E_q Q}{E_p^2 + E_q^2}$$

and $$I_q = \frac{E_q P + E_p Q}{E_p^2 + E_q^2}$$

In the case of bus A, since its voltage has been chosen as the reference vector for the system, this will lead to the same currents as before. In the cases of each of the other buses there will be some small difference as between the current values originally used and those to be used in the second approximation.

Furthermore, since the resistance-reactance ratios of the links differ, the distribution of current through the simulated networks differed, and although the drops obtained by the measurements made are those which would obtain

*Tabulation 11*

| Bus | E(KV) | Voltage phase angle | Three-phase power | | Three-phase KVAR | |
|---|---|---|---|---|---|---|
| | | | Assumed | Computed | Assumed | Computed |
| A | 33.333+j0. | 0°0′ | 5,000 out | 5,030 out | −5,000 out | −5,074 out |
| B | 32.248−j0.869 | 0°9′ lag | 3,000 out | 3,437 out | −6,500 out | −6,471 out |
| C | 33.229+j0.226 | 0°3.3′ lead | 2,000 out | 1,993 out | −1,500 out | −1,509 out |
| D | 32.249−j1.037 | 0°11′ lag | 6,000 out | 5,364 out | +1,000 in | +1,528 in |
| 1 | 34.833+j0.5 | 0°5′ lead | 10,000 in | 10,300 in | −10,000 in | −10,600 in |
| 2 | 33.309+j0.226 | 0°2.6′ lead | 6,000 in | 5,364 in | −2,000 in | −1,947 in |

The negative sign as applied to reactive KVA indicates merely that the direction of flow is the same as that of power. The notation "in" or "out" indicates whether the flow is into or out of the network. By subtracting the total flow of power out of the network from the total inflow, and similarly with the reactive KVA, we find the total three-phase losses in the network to be 455 KW and the three-phase reactive KVA used therein to be 1021 KVAR.

The solution thus arrived at gives the actual bus voltages and link and load currents that would exist around the network for one definite load distribution, but this is not exactly the distribution that was assumed in setting up the circuits. The total in-phase and quadrature currents supplied are the same but their distribution as between the generators and the loads differ. On an actual network the loads vary from moment to moment, and the assumed conditions are therefore merely typical, and the analysis results will usually be equally typical, or at least sufficiently so to give the information required.

The usual procedure would therefore be to assume some other typical load condition and repeat the analysis to obtain the drops and currents with the components actually flowing, these are not the exact currents which would flow in the links with the assumed loads, but instead those which would flow with the slightly different load which are tabulated in Table 10, differing from those assumed by the values $\Delta I_p$ and $\Delta I_q$. Considering bus B, for example, the voltage arrived at is not that which would obtain with the assumed load current of 30−j65 amperes, but with the slightly different current of 33.7−j67.8 amperes, and we are justified in believing that if we had originally assumed a current smaller, as to both components, in the right degree, we would have come out with the correct drops for the exact load desired. The voltages and loads with which we are starting the second approximation are not greatly different from those with which we started the first, and therefore if in the case of each load we subtract from the load currents computed from the approximate bus voltages and load characteristics the values of $\Delta I_p$ and $\Delta I_q$ found in the first approximation we should arrive more closely at the desired load currents at the conclusion of the second one. The results, of course, will not be exact, but the differences will be reduced to the second order. The following tabulation gives the values computed from bus voltage and load requirements, and the compensated values arrived at by subtracting $\Delta I$ and used in making the new set-up.

*Tabulation 12*

| Gen. or load | Computed current | $\Delta I$ | Compensated current |
|---|---|---|---|
| 1 | 100−j100 | 0 | 100−j100 |
| A | 50−j50 | 0.3−j0.7 | 49.7−j49.3 |
| B | 29.5−j67.9 | 3.7−j2.8 | 25.8−j65.1 |
| C | 20.8−j15.4 | 0.1−j0.5 | 20.7−j14.9 |
| D | 62.2+j8.3 | −4.1+j4 | 66.3+j4.3 |
| 2 | 62.5−j25 | | 62.5−j25 |

It will be noted that we are free to assume the current supplied by either generator, but that the current supplied by the other must equal the difference between the total load current and the current assumed to be supplied by the generator chosen. For that reason having assumed the currents supplied by $G_1$, the current components supplied to bus 2 by generator $G_2$ are determined completely by the computation of those flowing to and from the other buses.

The various simulated generators and loads of the four simulated networks are therefore set so that their respective milliammeters read the values shown in the last column of Tabulation 12, and the voltage measurements are made around the various links of the networks as before to determine the components of the voltage drop. Still using the voltage of bus A to neutral as the reference vector the new values of $V_p$ and $V_q$ are obtained, and from these components of voltage drop the values of $I_p$ and $I_q$ are computed by using the constants G and B as before. It is believed to be unnecessary here to go through the detailed computation involved, it being thought sufficient merely to set forth the final results:

*Tabulation 13*

| Link | V | I |
|---|---|---|
| 1A | 1500+j500 | 100−j100 |
| AB | 1151+j873 | 62.9−j43 |
| BD | 24+j176 | 33.3+j25. |
| 2C | 87.5+j37.5 | 62.5−j25 |
| CD | 1114+j1280 | 29−j16. |
| CA | −59+j233 | 12.1+j6.8 |

From the voltage drops as redetermined we can obtain the bus voltages to neutral as before, and, by multiplying these values by the quantity $\sqrt{3}$, the phase voltages at each bus. These values are tabulated below:

*Tabulation 14*

| Bus | $E_n$ | $E_n$ | $E_\phi$ |
|---|---|---|---|
| 1 | 34,833+j500 | 34,834 | 60.4 KV |
| A | 33,333+j0 | 33,333 | 57.73 |
| B | 32,182−j873 | 32,184 | 55.8 |
| C | 33,272+j231 | 33,272 | 57.6 |
| D | 32,158−j1049 | 32,160 | 55.7 |
| 2 | 33,360+j269 | 33,360 | 57.8 |

By adding algebraically the link current flowing to each bus as shown in Table 13, the currents flowing from the buses may be obtained as before, and these values are given in Tabulation 15, and, for comparison, the computed values of these currents as shown in Tabulation 12:

*Tabulation 15*

| Gen. or load | I (from Tab. 12) | I (from Tab. 13) | |
|---|---|---|---|
| 1 | 100−j100 | 100−j100 | Assumed |
| A | 50−j50 | 49.2−j50.2 | $(I_{1a}+I_{ba}+I_{ca})$ |
| B | 29.5−j67.9 | 29.6−j68.4 | $(I_{ab}+I_{db})$ |
| C | 20.8−j15.4 | 21.4−j15.3 | $(I_{2c}+I_{ac}+I_{dc})$ |
| D | 62.2+j8.3 | 62.3+j8.9 | $(I_{bd}+I_{cd})$ |
| 2 | 62.5−j25 | 62.5−j25 | Assumed |

As was assumed the discrepancies caused by the variation in the ratio $R/X$ throughout the network have been largely compensated, and the current values as computed from the voltage drop are practically identical with those required by the assumptions upon which the problem is based.

The KW and KVAR arrived at in the second analysis are as follows, those originally assumed being given for comparison:

*Tabulation 16*

| Bus | Assumed KW | Computed KW | Diff., percent | Assumed KVAR | Computed KVAR | Diff., percent |
|---|---|---|---|---|---|---|
| A | 5,000 out | 4,920 out | −1.6 | −5,000 out | −5,020 out | −0.4 |
| B | 3,000 out | 3,038 out | +1.3 | −6,500 out | −6,533 out | −0.5 |
| C | 2,000 out | 2,124 out | +6.2 | −1,500 out | −1,540 out | −2.5 |
| D | 6,000 out | 5,992 out | −0.13 | +1,000 in | +1,057 in | +5.7 |
| 1 | | 10,300 in | | | 10,600 in | |
| 2 | | 6,250 in | | | 2,561 in | |

KW Loss in network=476 KW.
KVAR Used in network=1,125 KVAR.

Certain instances may arise, however, where the second computation will not give the true division of current through the circuit and where a third approximation must be made. This situation is most apt to arise where two circuit links are directly in parallel, without intermediate load points, and with greatly different resistance-reactance ratios. Even under these circumstances the final result may be obtained as accurately as may be desired by successive approximations, but under these circumstances the series represented by these approximations converges rather slowly and it is better, for the purposes of analysis, to substitute a single equivalent circuit for the two parallel links, obtain the current components through and voltage drops across this equivalent circuit, and with the values thus obtained determine the distribution of currents as between the parallel links by conventional computational methods. In practically all other cases it is desirable to set up the simulated network to represent exactly the impedance values in the actual circuit.

As has already been indicated the circuits shown in Figs. 3 and 4 have been reduced to their simplest terms in order to indicate the mathematical basis for the method of my invention, rather than to show the apparatus for performing it. In a practical device for operation in accordance with the method it is highly desirable, if not in fact necessary, that many of the adjustments and measurements should be greatly simplified. In setting up a simulated network with the simple circuits of the figures thus far described, various of the values or settings which should be interdependent for ease of operation, are actually independent, whereas others which should be capable of independent setting will be found to be interdependent.

It is the latter situation which would actually cause most difficulty in practice. With the loads and generators simulated by simple rheostats, and with the adjustments of any of these rheostats altering the entire distribution of voltage drop throughout the respective networks, it is clear that to obtain the required currents at all buses would involve an almost endless series of successive approximations, and it is quite possible that with a network of any complexity the time consumed might even approach that which would be required for actual computation. Obviously, too, it is necessary that for practical use the device should be arranged so that networks of any configuration may readily be set up, and that various connections and metering jacks should be supplied so as to facilitate the measurement of the various quantities desired. Further, as will later be shown, it is possible to provide auxiliary apparatus whereby various of the quantities which have been indicated as being found by computation may be measured directly.

The present invention contemplates the use of various such refinements, and the remainder of this specification will be devoted to the consideration of the actual circuits and networks for accomplishing the desired results.

For practical use it is preferable that the device be made of a plurality of units of various types, with interconnection means so that these units may be patched together to form networks of any desired configuration. It is further desirable that these units be so interrelated and interconnected that a minimum number of adjustments and measurements need be made in order to obtain the required information. The device as actually constructed is therefore composed of units of four separate types, i. e. (1) generator units, (2) load units, (3) circuit or link units, and (4) a metering unit. Units of types 1 and 2 may conveniently be made identical in structure. Such identity is obviously advantageous, since it adds greatly to the flexibility of the equipment in that generators and loads may be interchanged at will in setting up various projected networks, and more networks may be simulated with a given number of units.

To avoid the difficulties of adjustment that have been mentioned above, it is desirable that the generator and load units be actual current-limiting devices, i. e., devices wherein the current passed is independent of voltage through a relatively large range of operation. One method of obtaining this result is to utilize the saturation current of a diode, and in Fig. 5 there are shown generator and load units of this type connected by one link of a network, e. g., the link IA in the schematic network previously described.

Figure 5:
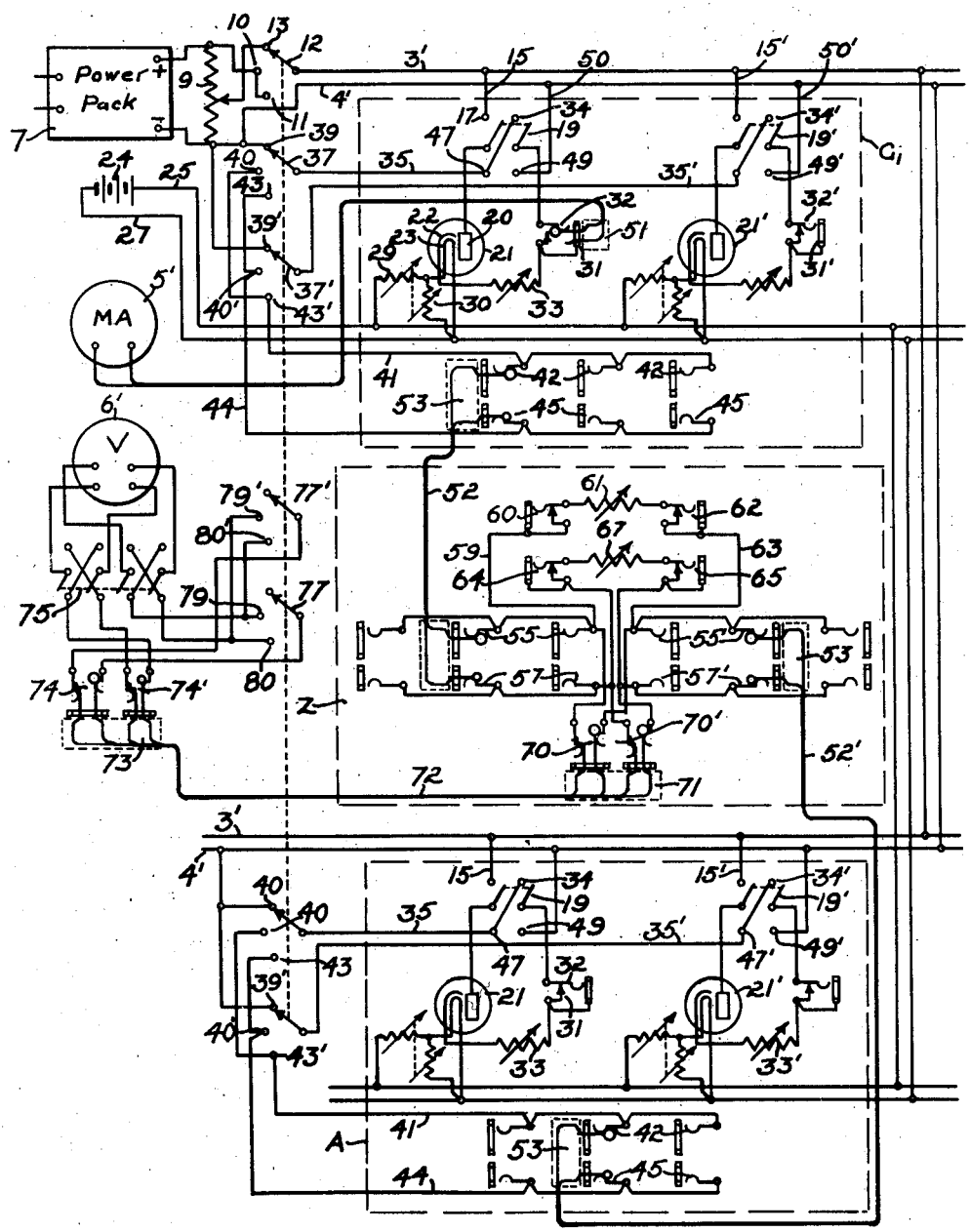
Fig. 5 is a schematic diagram showing in more detail a portion of the network illustrated in Fig. 3.

In the set-up of Fig. 5 a single power supply unit or power pack 7 supplies current for the entire analyzer. Although not strictly necessary it is desirable that the power supply unit be of the regulated type, so that the set-up, once made, may be as stable as possible. Since these supplies are familiar in radio practice it is considered unnecessary to show it in detail.

The supply 7 is connected across a potentiometer 9 which is useful in adjusting the voltage to be supplied to the various generator and load units in making the initial adjustments. The positive end of the potentiometer connects to two points 10 and 11 of a three-point switch 12. The third point 13 of this switch, is connected to the variable contact of the potentiometer, and the switch arm 12 is itself connected to the positive lead or bus 3' which corresponds to the bus 3 in Figs. 3 and 4. The negative terminal of the power pack and potentiometer connect to a lead 4' which corresponds to the negative lead 4 in the preceding figures.

The supply 7 feeds as many generator and load units as may be required to simulate any network which is to be analyzed. In the present instance two such units are shown, the one which is used to simulate the generator $G_1$ being indicated generally by this reference character, which is applied to the dotted line delimiting the apparatus included within this unit, while the unit which is employed to simulate the load A is similarly indicated by this reference character.

Each of the units is dual in character, comprising elements for carrying both $I_p$ and $I_q$ components. The elements for supplying the two components are identical, and therefore only one set will be described, the relation with the other set being reserved for later consideration.

Connected to the bus 3' by a tie-line 15 is a contact 17 of a double-pole double-throw switch 19. When this switch is thrown to its upper position, which will be hereinafter referred to as the "generator" position, the lead 17 connects to the plate 20 of a diode 21. The diode is provided with a cathode 22 which is insulated from the heater element 23. The heater is shown as being energized by a battery 24, since it is important that the voltage upon it be maintained constant throughout any series of measurements, but it is understood that the battery may be replaced by any known form of constant voltage device which will maintain this condition. The source 24 feeds the two filament or heater buses 25 and 27, which supply all units with heater current. Heater 23 connects directly to the heater bus 27 and is connected to bus 25 through an adjustable rheostat 29. A second rheostat 30 is shunted across the heater, and the two adjustments are interconnected so that as the resistance in series with the heater decreases that in shunt increases. By proper interrelation of values of these two rheostats the control temperature of the cathode 22 may be made extremely accurate, and this is important since the operation of the device to limit the current flow depends upon the saturation current of the cathode and hence upon its temperature.

The cathode connects to one contact 31 of a closed circuit milliammeter meter jack, whose other contact 32 connects to the second arm of the double-pole double-throw switch 19. A trimmer rheostat 33 is preferably inserted in this circuit, although it is not strictly necessary.

When the switch 19 is thrown to its upper or generator position, the contact 32 of the jack connects through the switch point 34 and lead 35 to the arm 37 of a three-point switch which is similar to and is ganged with the three-point switch 12. The upper point 39 of switch 37 connects to the bus 4'. The second point 40 connects through lead 41 to a group of open circuit bus jacks or polarized sockets 42, all connected in parallel, for connecting impedance units to the generator unit. The third point 43 of the switch 37 connects through lead 44 to a second set of parallel contacts 45 of the bus jacks.

When the double-pole double-throw switch 19 is in the down position, (hereinafter referred to as the "load" position), the connection between the plate 20 of the tube 21 and the bus 3' is broken and the plate 20 connects instead through the contact 47 and lead 35 to the arm 37 of the second three-point switch. At the same time the connection from the cathode through the milliammeter jack contacts 31 and 32 is disconnected from the switch arm and connected instead through a switch contact 49 and tie-line 50 to the negative bus 4'.

The milliammeter jack 31, 32 is for the measurement of the current supplied by the units, and connects through a plug 51 to the milliammeter 5', corresponding to any of the milliammeters 5 in Figs. 3 and 4.

The elements thus far described of the $G_1$ unit are those utilized for supplying the $I_p$ component of the simulated network. They are duplicated substantially by those supplying the $I_q$ current, which are indicated by the same reference characters distinguished by accents, the only difference between the two connections being the interchange of connections between contacts 40' and 43' of the ganged three-point switch as compared with the contacts 40 and 43, that is, contact 40' connects to lead 44 and jack contacts 45 instead of lead 41 as does contact 40 and contact 43' connects to lead 41 instead of lead 44.

As has already been mentioned, the load unit A is identical in all respects to the generator unit $G_1$, and therefore the same reference characters are used throughout in designating its various elements. When these units are in use the only distinction between generators and loads resides in the position of the switches 19, 19'.

Generator and load units are connected to the various impedance units, one of which is shown in the figure and designated by the reference character Z, by patching cords 52, 52', which are provided at each end with polarized plugs 53 adapted to engage the bus jack contacts 42, 45. Similar polarized sockets comprising contacts 55 and 57 are connected in parallel in the impedance unit Z. The contacts 55 connect through a lead 59 and a closed circuit milliammeter jack 60 to one end of a calibrated variable rheostat 61 which simulates the resistance component R of the impedance link which it simulates. The other end of the rheostat 61 connects through another closed circuit milliammeter jack 62 and a lead 63 to the contact 55' of another set of polarized sockets, connected in parallel as are the contacts 55. The milliammeter jacks are provided at both ends of the rheostat because by the use of dead plugs they may also serve as switches, and it is useful at times to be able to open the current at either end.

The contacts 57 and 57' similarly connect through milliammeter jacks 64 and 65 to the two ends of a calibrated variable rheostat 67 which simulates the reactance X of the circuit link to be measured.

A four-pole polarized socket, indicated by the general reference character 70, is provided in each of the impedance units for making the necessary voltmeter connection. One pair of the contacts in this socket is connected across the calibrated rheostat 61, and the other pair across the rheostat 67. The socket engages a polarized plug 71 and a four-conductor voltmeter cord 72, which has a similar four-pole plug 73 engaging the voltmeter socket 74. The connections of the plugs 71 and 73 are such that contacts 70, connected across rheostat 61, connect to contact 74, while contacts 71' connect to contacts 74'. Contacts 74' connect through a four-pole reversing switch 75 to one of the two electrically distinct windings of the voltmeter 6'. Contacts 74 connect to the arms 77 and 77' of two three-point switches which are ganged with the switch arm 12. The middle contacts 79 and 79' of these switches and the end contacts 80 and 80' are connected, respectively, in opposite sense through the remaining arms of the reversing switch 75 to the other winding of the voltmeter 6'. The first contact of the ganged three-point switches are left open.

The result of this connection is that one only of the coils of the voltmeter 6' is reversed when the gang switches 77, 77' are moved between positions 2 and 3, to provide for the reversal of sense of the $R_qI_q$ drop as compared to the $R_pI_p$ and $X_qI_q$ drops. The reversing switch 75 may be omitted if the voltmeter 6' be made a center reading instrument, this instrument being read as recording positive or negative voltage drops depending upon whether the switch 75 be thrown to the upper or lower position.

With the circuit elements as thus described we may follow through the set-up and testing of one link of a network, it being recognized that the same operation would merely be duplicated were additional links added.

The three-point gang switches are first thrown into the position shown, with the various switch arms connecting the upper of the three contacts of each switch, and the switches 19, 19' of both generator and load unit are all thrown to the "generator" position. This connects all of the diodes 21, 21' directly between the buses 3' and 4', with somewhat reduced voltage between cathode and plate. The reduction of voltage is not, in theory, necessary, and care should be taken that the potentiometer 9 is so set that the tubes will all operate at current saturation. Reduced voltage is advisable, however, to avoid overworking the tubes since the full voltage provided is sufficient to operate the two tubes in series whereas in the set-up position full voltage is applied across each tube.

The milliammeter 5' is then plugged in across the jack contacts 31, 32, and the gang rheostats 29 and 30 are adjusted until the milliammeter reading corresponds to the $I_p$ component of current to be supplied by the generator $G_1$. When this result has been obtained the milliammeter is plugged in across the contacts 31', 32' of the $G_1$ unit and the heater unit of the tube 21' is adjusted until the milliammeter reading corresponds to the $-I_q$ component of the generator current.

Similar adjustments are then made of the current passed by the two tubes 21 and 21' of load unit A.

The simulated network is now set up by the use of the patching cords 52, 52', connecting the bus jack contacts 42 and 45 of the generator unit with the input bus jack contacts 55 and 57 of the impedance unit, and the output contacts 55' and 57' of the impedance unit connecting with the contacts 42 and 45 of the load unit. Owing to the provision of parallel jacks as many more units as may be desired may be patched in to give any desired network configuration. It will also be noted that the description of contacts 55 and 57 as input contacts and 55' and 57' as output contacts is largely an arbitrary one. The distinction is useful in defining the sense of the voltage drops, for with the patching cord connected as shown the link represented by the impedance unit Z would be defined as the link 1A, whereas if the connection to generator and load units were reversed the link would be defined as the link AI and the voltage drop would be reversed in direction. In either case the voltage drop would be of the proper sign for addition around the network in the direction indicated by the designation of the link. Were it necessary always to have the actual current flow in the same direction through the unit its manipulation would be greatly complicated, since in some networks it is difficult to tell in which direction the drop will be through certain of the links, and it is frequently possible that the reactive voltage may be in the opposite direction to the resistive drop.

It is further to be noted that the patching cords are of negligible resistance and do not represent the line, but rather the buses of the simulated network.

The calibrated rheostat 61 is now set to the proper value to represent the resistance of the link IA, and the rheostat 67 to the reactance value, and the gang switches are moved to the second or intermediate position. Further, the switches 19, 19' of the load unit A are moved to the lower or load position. It is to be noted, however, that if the unit A were being used to represent a synchronous condenser or other load having a leading power factor, i. e., supplying reactive current to the network rather than withdrawing reactive power therefrom, the switch 19' would be left in the "generator" position.

It is advisable, before the actual measurements are made, to check the current values at generator and load units. A final adjustment is made of the heater rheostats 29 and 30, and the high resistance rheostat 33 may also be used as a trimmer, the effect of a rheostat in this position upon the circuit being extremely small and only adapted for introducing final corrections in the values measured.

With the three-point gang switches in their central position and the generator and load switches 19, 19' properly set, the analyzer is in condition for measuring the $V_p$ voltage drop. The circuit for measuring the $I_pR$ component of the drop may be traced as follows: Starting from the positive bus 3' current flows through the tie-line 15 and contact 17 to the plate 20 of the generator tube 21 and thence to the cathode 22 of the tube. From the cathode the flow is through resistor 33, the closed circuit jack and the switch 19 through lead 35, contacts 40, and lead 41 to bus jack 42 and thence through cord 52 and contact 55, lead 59 and rheostat 61 (where the voltage drop to be measured is produced) and so through socket contact 55', and patching cord 52' to contact 42 in the bus jack of the load unit. From this jack leads 41 connect to switch point 40, leads 35 and contact 47 of the load unit to plate 20, cathode 22, the milliammeter jack contacts 31 and 32 and contacts 49 of the switch 19 back to bus 4' and the power unit 7.

The path of the $I_q$ current may similarly be traced through the tube 21' of the generator unit, the contacts 45 and 57 of the polarized bus jacks, and the calibrated resistor 67 representing the reactance, the paths otherwise being through the like numbered (but accepted) elements as those traversed by the $I_p$ current.

With the voltmeter plugs 71 and 73 in position as shown, the voltage drops across the two resistors 61 and 67 will be algebraically added by the voltmeter 6' to give the total in-phase component of voltage drop. It will be noted that in the general case this drop may be either positive or negative, and in the set-up as shown the sign is indicated by the position of the switch 75.

The gang switches are then moved to the lower or third point. The effect of this is to interchange the connections of the tubes 21 and 21' as between the simulated resistances and reactances, the tubes 21 now being connected through the resistor 67 and tubes 21' to the resistor 61. It may be advisable to readjust the trimmer resistances 33, to obtain an exact check of the proper values for the current components $I_p$ and $I_q$, although this will not ordinarily be necessary. The voltmeter connections now are such as to read the quadrature voltage drop, which again may be either positive or negative in value, but the voltmeter connections are such as to give this drop its proper conventional sign as the resistance component winding is reversed by the action of the switch arms 77, 77'. With a complete network set-up, the voltmeter will be plugged in successively on the various links to obtain the components on each link, it being preferable to measure the in-phase components in all links before the three-pole switch is moved to the third position and the quadrature components measured.

The set-up of Fig. 5 represents a two-circuit system which, of course, greatly facilitates the analysis of any network. If, however, sufficient units are provided to set up all four simulated networks simultaneously, the addition of more elaborate metering equipment will permit direct observation of many of the quantities which must be computed where only the two simulated networks are used.

Figure 6:
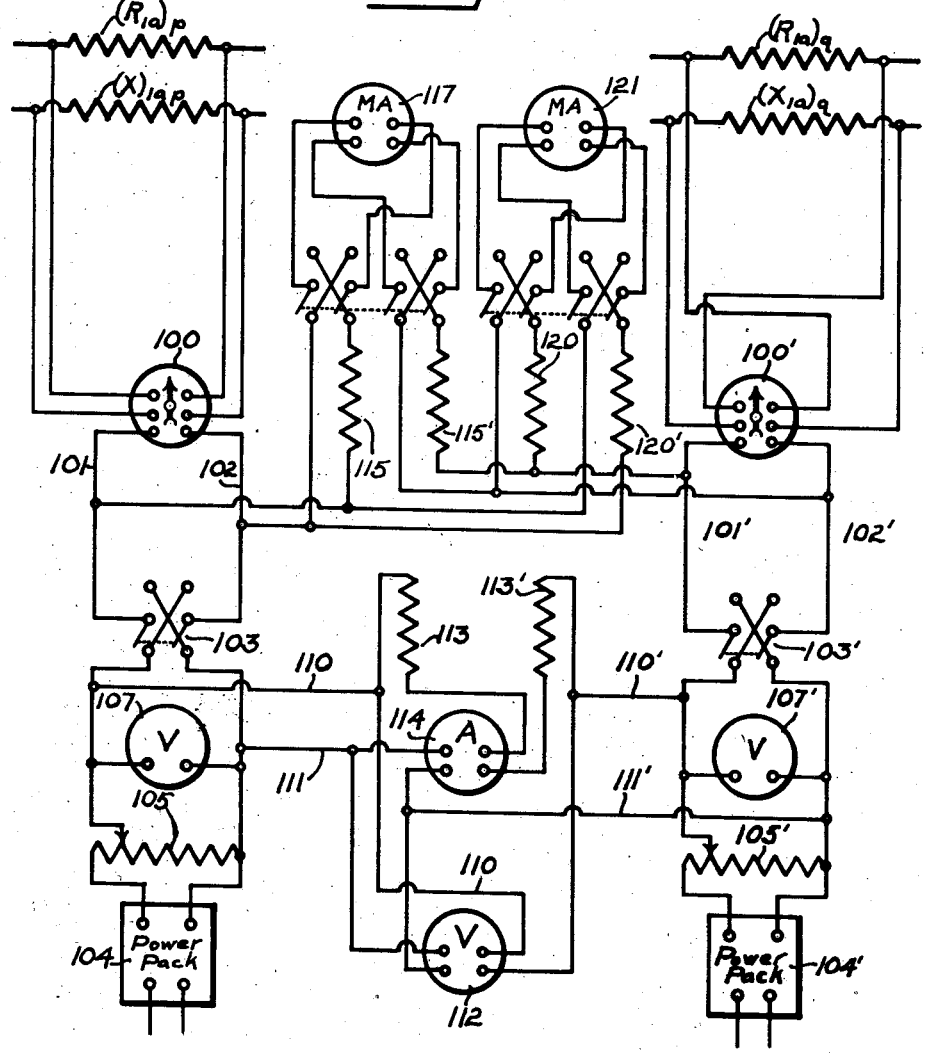
Fig. 6 is a schematic diagram of one form of metering arrangement adapted for use in a four-circuit analyzer comprising a combination of the elements shown in Figs. 3 and 4.

Such a metering system is shown schematically in Fig. 6, wherein the resistors $(R_{1a})_p$, $(X_{1a})_p$, $(R_{1a})_q$ and $(X_{1a})_q$ represent the links thus marked in Figs. 3 and 4, i. e., resistances 61 and 67 respectively in two similar impedance units such as are shown in Fig. 5.

Considering, for the moment, only the resistors $(R_{1a})_p$ and $X_{1a})_p$, these are bridged by two electrically separate windings of a voltmeter 100 wherein three such windings are provided, and when only the first two windings are excited the voltmeter will read the quantity $(V_{1a})_p$. The third winding is connected through leads 101 and 102 and a reversing switch 103 to a voltage-regulated power pack 104, which is provided with a potentiometer 105 for adjusting its output voltage. With the switch 103 closed the potentiometer may be adjusted so that the voltage applied to the third winding of the voltmeter 100 balances the forces produced by the two other coils thereof and brings the voltmeter 100 back to a zero reading. When this condition obtains the reading on the voltmeter 107 connected across the potentiometer should equal the reading of voltmeter 100 before the balance was obtained, or, if preferred, the meter 100 may be made merely a sensitive balance indicator rather than an actual voltmeter, and the value of $(V_{1a})_p$ may be read directly from voltmeter 107. The result of this adjustment is that there exists across the leads 101, 102 a voltage which is equal to the in-phase component of the voltage drop across the link under measurement. A similar arrangement is provided for measuring the quadrature component of voltage drop across the links $(R_{1a})_q$ and $(X_{1a})_q$; the only difference being that the connections across the $(R_{1a})_q$ are transposed to take account of the reversal of sign of the resistance component in measuring the $V_q$ drop. The various elements of this second balance circuit are indicated by the same reference characters as those used in the circuit previously described, but distinguished by accents.

We now have available voltages proportional to the two quadrature components of drop in the links, and these are used to obtain measurements of the various other quantities necessary for the complete analysis. Connected across the balancing voltage leads through the lines 110, 111, 110' and 111' respectively are two windings of a voltmeter 12. As in the other double winding instruments mentioned, these windings are electrically separated. The meter itself, however, differs from those heretofore described in that it is of a type wherein the forces set up by the applied voltages are proportional to the square of those voltages, i. e., the meter may be an electrodynometer or a thermocouple type, or any other type having this characteristic. The calibration of the meter itself, however, is directly in volts, resulting in the square law scale which is customary on alternating current instruments. Each of the two coils, however, act separately, and the total force effective on the movement is equal to the sum of the squares of the two voltages, and the scale being calibrated in terms of the square root of the applied forces the reading is directly the scalar or total voltage across the links.

The total currents effective in the links are determined by a similar expedient. The leads 110 and 111 are bridged by a circuit comprising a variable resistor 113 in series with one winding of a square law ammeter 114, while the leads 110' and 111' are similarly bridged by a circuit comprising the resistor 113' and the other winding of the ammeter 114. The rheostats 113, 113' are of the calibrated type, and each is set to a value of resistance proportional to the total impedance Z of the link being measured, and since the total current flowing in the link is defined by the equation $$I = \sqrt{\left(\frac{V_p}{Z}\right)^2 + \left(\frac{V_q}{Z}\right)^2}$$

ammeter 114 is also of the square law type, indicating the square root of the sum of the squares of the currents in its windings, the computed value of the total current in the links, as derived from the voltage drop therein, is read directly on this ammeter.

The remaining circuits in this figure are utilized to obtain direct readings of the vector components of the current. A circuit comprising a calibrated rheostat 115, and one winding of a milliammeter 117 is bridged across the leads 101 and 102, while a similar circuit including the rheostat 115' and the other winding of the milliammeter is bridged across the leads 101', 102'. A reversing switch 119 for simultaneously reversing the polarity of connection of both windings of the milliammeter is included in both circuits.

The rheostats 115 and 115' are set respectively to the values of two auxiliary constants M and N, where $$M = \frac{R^2 + X^2}{R} \text{ and } N = \frac{R^2 + X^2}{X}$$

Each of these two quantities has the dimensions of an impedance, and they may be recognized as the reciprocals of the quantities G and B which were used in obtaining the current components tabulated in Tables 8 and 9. There will therefore flow in one winding of the voltmeter 117 a current proportional to $$\frac{V_p}{M}$$

and in the other winding a current proportional to $$\frac{V_q}{N}$$

The meter 117 is of the permanent magnet type and gives as its reading the algebraic sum of these two quantities, and since $$I_p = \frac{V_p}{M} + \frac{V_q}{N}$$

the reading of milliammeter 117 will be equal to the power component of the current in the links.

Similarly bridged across the leads 101, 102, 101' and 102' are circuits comprising calibrated rheostats 120 and 120' and the two windings of a second milliammeter 121. The two circuits thus comprised differ from those feeding ammeter 117 in that the rheostats representing the quantities M and N are interchanged, and the coils are connected in such direction that the milliammeter reads directly the quadrature component of current.

Figure 7:
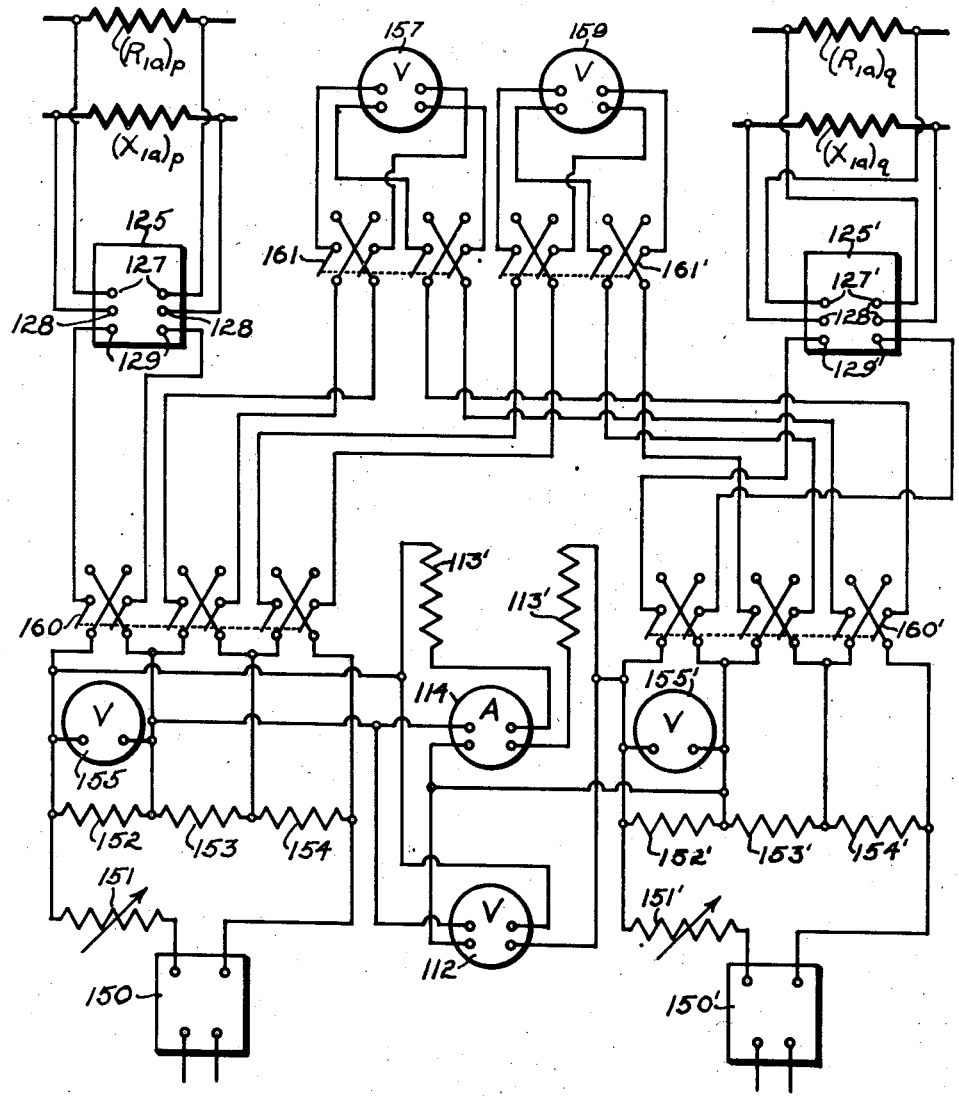
Fig. 7 is a similar diagram showing a second form of metering arrangement as used in a four-circuit analyzer.
Figure 8:
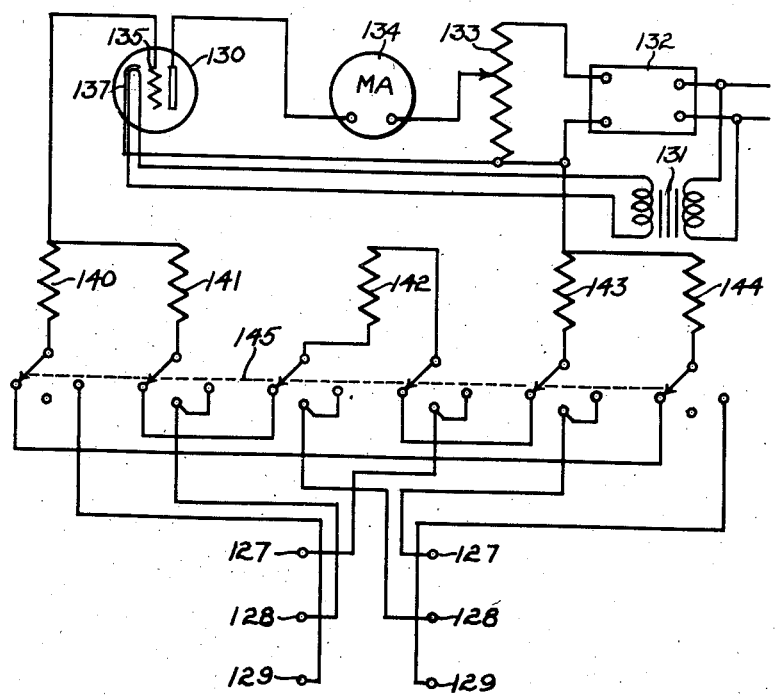
Fig. 8 is a detailed schematic diagram of a voltage-balancing device forming one element of the metering system of Fig. 7 and shown in the latter figure in block form.

A further refinement of the same system as is shown in Fig. 6 is illustrated in Fig. 7, wherein the resistors $(R_{1a})_p$, $(X_{1a})_p$, $(R_{1a})_q$ and $(X_{1a})_q$ are shown in the two upper corners of the diagram as before. Instead of bridging these resistors by means of a three-winding voltmeter to indicate a balance voltage thereacross, a vacuum tube balancer 125 is used, this balancer being shown in detail in Fig. 8. The balancer comprises a vacuum tube 130, with the usual filament supply 131 and plate supply 132. Both of these should be of the voltage-regulated type. A potentiometer 133 is connected across the plate supply, and the plate circuit includes a milliammeter 134, which is used to indicate balance. Connected between the grid 135 of the tube and the cathode 137 is a balancing network, which comprises five resistors 140 to 144 inclusive. These resistors should be of high ohmage—of the order of megohms—in order to achieve the accuracy and sensitivity of which the device is capable, and which should be achieved in order to make the use of the device worth while, since it is obviously more complex than the simple meters heretofore described and therefore its use is justified only by increased sensitivity, which permits higher resistance values and lower current values to be used in the analyzer networks considered as a whole.

The resistors are interconnected by a three-way gang switch indicated generally by the reference character 145. In the position shown (position 1) resistors 141, 142 and 143 are connected in series as a branch circuit between the grid 135 and the cathode 137, and resistors 140 and 144 are also connected in series as a second branch circuit between the same points. The values of the resistors are so chosen that the resistances of the two branches are equal. This position is used for calibration only, and with the switch thus set the potentiometer 133 is adjusted so that the milliammeter 144 gives a predetermined reading which is thereafter used to indicate the condition of balance. When the switch 145 is thrown to its middle position (position 2), terminals 127 are interposed between resistors 142 and 143, which include $(R_{1a})_p$ and the potential drop across it in series with one branch of the grid filament circuit (see connections in Fig. 7), and at the same time terminals 128 and resistance $(X_{1a})_p$ are included in the same branch circuit between resistors 141 and 142. The branch of the circuit comprising resistors 140 and 144 is open in this position of the switch.

This position is used for the determination of the sense of the voltage drop of the component being measured, increasing the reading of the meter 134 if this be such as to swing the grid positive, and decreasing it if the grid be swung negative.

Swinging the gang switch to the third position leaves connections 127 and 128 in the circuit in the same manner as before, but closes the parallel circuit comprising resistors 140 and 144 with terminals 129 included. If the potential across these terminals is equal and opposite to the sum of the potentials across the other two it will cause a circulating current to flow in the parallel circuits and if the sum of resistances 140 and 144 is equal to the sum of resistances 141, 142 and 143, the potential drop as between the grid 135 and cathode 137 will be zero, on the same principle as the drop across the balance points of a Wheatstone bridge is zero. The milliammeter 134 will then read the same value as it did in the calibration position.

In practice it is convenient to have the resistance R of resistors 140, 142 and 144 equal and to have the resistance of each of resistors 141 and 143 equal to $R/2$. This condition is not essential, however, nor is it absolutely essential that the five resistances be included, since under certain circumstances any two of the resistors can be combined as long as the resistance of the two branches is equal. The separation as shown is desirable, however, since it effectively isolates the various circuits to be measured and prevents cross currents, owing to the high value of resistances used.

Returning now to Fig. 7, the balancing voltage applied across terminals 129 is derived from a stabilized power pack 150 which feeds a network comprising an adjusting rheostat 151 and three series resistors 152, 153 and 154. The resistor 152 has some value K which is arbitrarily chosen with reference to the current it is desired to use from the power pack 150 to produce a voltage drop across this link of the circuit and the voltmeter 155 which will produce a balance in the balancer 125. The voltmeter 155 therefore reads the total power component of voltage drop.

The link 153 has a resistance equal to KG where G is the conductance used in ascertaining the link currents, i. e., $$G=\frac{R}{R^2+X^2}$$

The link 154 has a resistance which is equal to KB, where B is the susceptance, before mentioned, i. e., $$B=\frac{X}{R^2+X^2}$$

Voltages will therefore appear across the two links 153 and 154 which are proportional to $V_pP$ and $V_pB$. As in the connections of Fig. 6 these voltages are applied across the windings of the two winding voltmeters 157 and 159, and there applied in combination with voltages similarly derived from the symmetrical circuit shown on the right of the figure to give readings proportional to $I_p$ and $I_q$, respectively, in the link 1A. As in other cases the elements used for measuring the quadrature components are indicated by the same reference characters as used to identify the power component elements distinguished by accent.

The gang reversing switch 160 is used in order to apply the balancing voltage across terminals 129 in the proper direction, and the reversing switch 161 is operated to obtain positive deflection of 157 and to give the sign to be applied to $I_p$. These reversing switches are in lieu of the use of center zero voltmeters.

Figure 10:
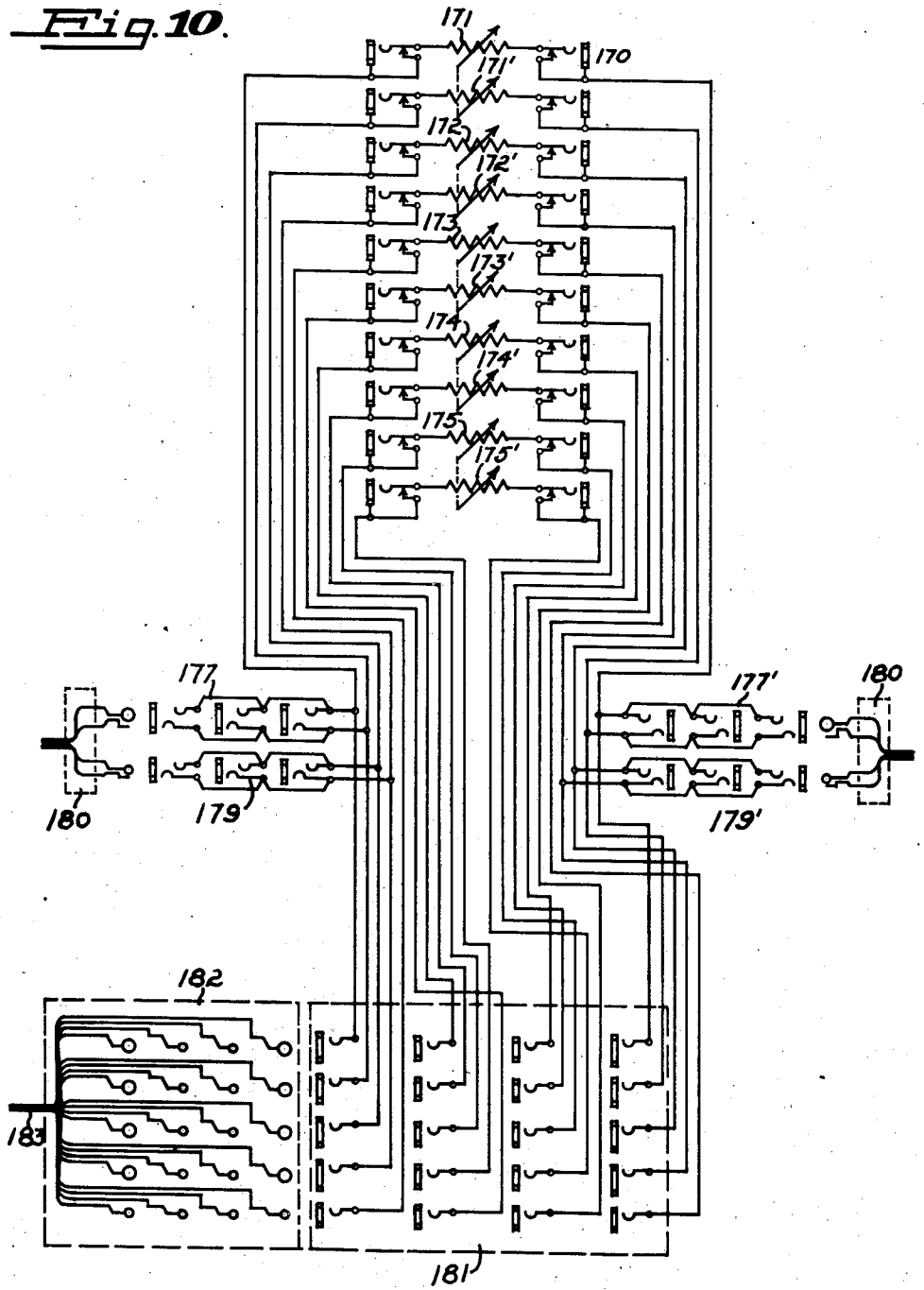
Fig. 10 is a diagram of an impedance unit such as is used to constitute each link of the simulated circuits of an analyzer constructed in accordance with this invention, showing the mode of connection with the metering unit of Fig. 9.

The circuits connecting voltmeter 112 and ammeter 114 are similar to those shown in Fig. 6, and the same reference characters are used throughout these circuits.

Where the metering systems shown in Fig. 6 or 7 are used it is convenient to set up all the quantities involved in a single impedance unit in the actual analyser. The connections for such an impedance unit are shown in Fig. 10.

Calibrated resistors are used for setting up each of the quantities, and these are preferably made similar in construction and are provided at each end with closed circuit metering or disconnect jacks 170. Since, in a four-circuit network analyzer, each of the quantities must be set up twice, it is convenient to gang the calibrated resistances which must be set to the same values, for example, calibrated rheostats 171 and 171' are ganged together, and in making a measurement they are each set to the value corresponding to the resistance of the link, i. e., they represent, respectively, $(R_{1a})_p$ and $(R_{1a})_q$. In like manner calibrated rheostats 172 and 172' are ganged so that a single setting will give the value of $X_p$ and $X_q$ in the two circuits. Resistors 173 and 173' are each set to the value Z, 174 and 174' to the derived constant M and 175 and 175' to the value of the constant N.

The bus jacks 177 and 179 (input jacks) and 177', 179' (output jacks) are provided in the same manner as in Fig. 5 for patching the units together, using four conductor cables and polarized plugs 180. The resistances representing $R_p$, $R_q$ and $X_p$ and $X_q$ are included in series between corresponding contacts of the jacks 177, 177' and 179, 179'.

From each end of each of the resistors 171 to 175 and 171' to 175' inclusive a lead is brought to one conductor of a twenty-conductor socket 181 which coacts with a metering plug 182, schematically shown at the bottom of the figure. It is believed that to apply specific reference characters to each of the contacts shown would only add confusion to the drawing, and hence they are omitted. The plug, however, is connected by a twenty-conductor cable 183 with the metering panel which is shown schematically in Fig. 9, and terminates on a terminal board 184, and the terminals on this board are identified by characters indicating the values of the resistors 171 to 175 across which these leads are connected. The actual metering set-up is the same as that shown schematically in Fig. 6, the meters are identified by the same reference characters, and it is therefore thought unnecessary to repeat the description of the circuits. In this diagram, however, the milliammeters 114, 117, and 121 are shown as provided with shunts 185, 187 and 189 respectively, and the voltmeters 107, 107' and 112 are provided with multipliers 190, 190' and 191, in order to extend the available range of reading which may be taken with the device. The polarized plugs 180, mentioned in connection with Fig. 10, are connected to the terminal board 184 as shown.

Figure 15:
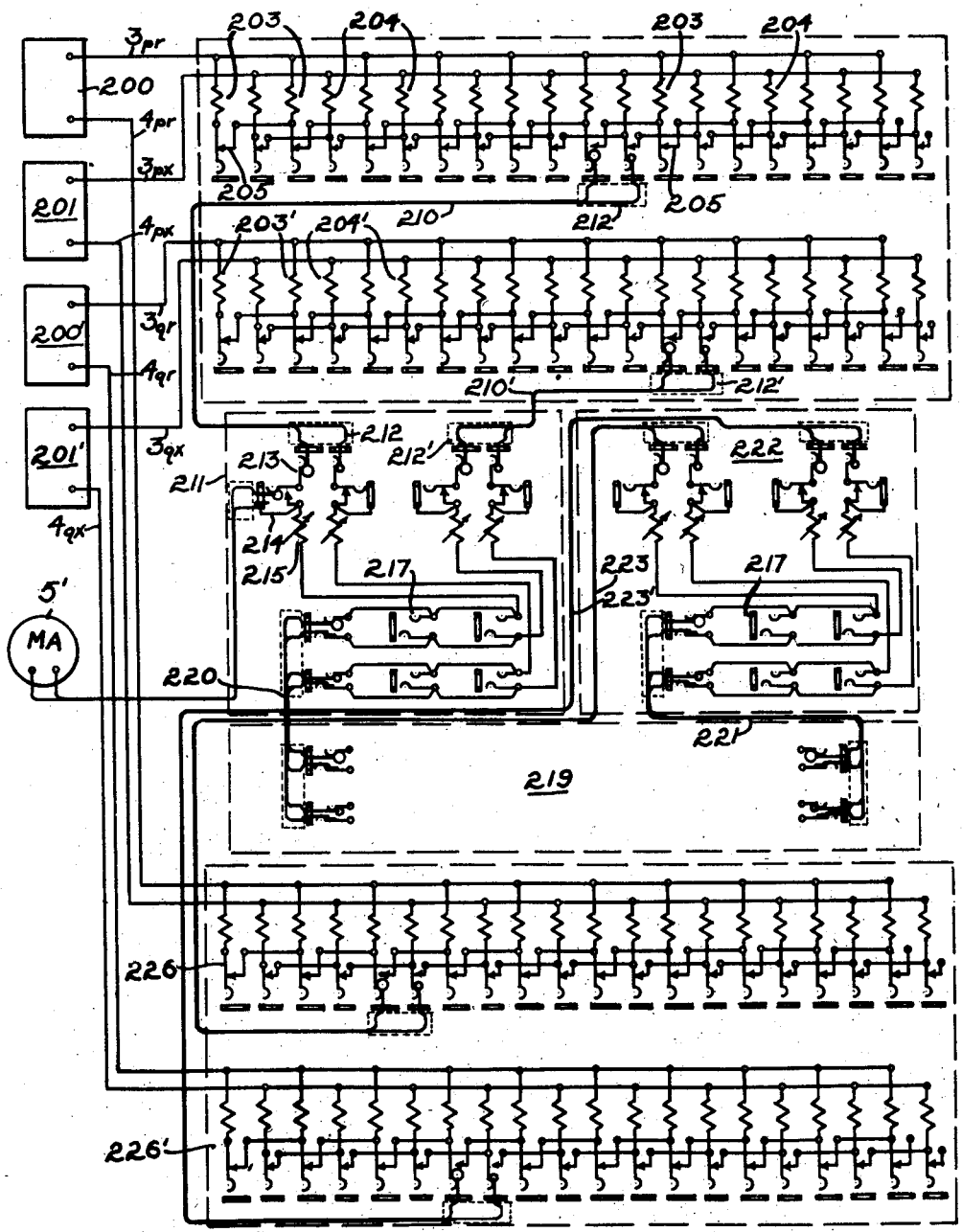
Fig. 15 is a schematic diagram of a modified form of circuit analyzer, employing the general type of constant current supply shown in the immediately preceding figures and illustrating the setup to analyze a portion of the circuit of Fig. 1.

This type of impedance unit may be utilized with simulated generators such as are illustrated in the two-circuit network of Fig. 5, or they may be employed with the somewhat different type shown in Fig. 15. In this case separate current-limiting units 200, 200' and 201, 201' are used to supply the total current components utilized in each network, instead of using a separate current limiter for each generator and load. Thus the current limiter 200, which is at the same time a current supply unit, furnishes the entire $I_p$ component to the network for determining the $V_p$ drop, the unit 201 supplies the $I_q$ component for measuring the same drop while the units 200' and 201' exercise the same function in determining the $V_q$ component. In this type of set-up the positive terminal of the unit 200 connects to a bus $3_{pr}$ while its negative terminal connects to bus $4_{pr}$. Bus $3_{pr}$ connects to a network comprising a plurality (in this case ten) of relatively high ohmage resistance elements 203, of equal value, each branching off from the bus and terminating in the contact 205 of a closed circuit jack. The circuit-closing contact 205 of each of these jacks is connected to the free end of the next resistor and the plug contact of the next jack in the array. When no plug is inserted in any of the jacks the ten resistors are therefore all connected in parallel. A plug inserted in the first jack of the series will connect to the bus through one of the resistors only, all resistors to the right being disconnected from this plug. In like manner a plug inserted in the second of the jacks will be connected to the bus through two of the resistors 203 and so on.

The principle of this arrangement is that the current provided by the supply 200 may be divided between any number of circuit links by steps of approximately 10%. In actual operation the last jack of the series is always used to connect to one generator unit, and if this be the only jack plugged into this generator unit will supply 100% of the $I_{pr}$ component of the load. If another plug be now inserted in the sixth jack, as is shown in the figure, this plug will receive 60% of the current (approximately) which will flow through the six resistors in parallel on the left of this plug and the remaining 40% will flow through the resistors on the right (which have been disconnected from the first six by the insertion of the plug) through the last plug in the array. In this manner the current may be divided through as many generator circuits as desired. The apparent limitation, of course, is that fractional increments between the 10% points cannot be accounted for although it is of course possible to increase the number of jacks supplied. Actually the current division is not exact in any case, and means are provided for making the final division of current by generator unit adjustment, as will be described below.

A precisely similar network and set of jacks is connected to the positive bus $3_{px}$ fed by the unit 201, the parallel resistors 204 being paired with the resistors 203, so that a dual plug 212 can be used to make connection with both units simultaneously. The units 200' and 201', supplying buses $3_{qr}$ and $3_{qx}$ are similarly connected, with their respective jacks paired to be simultaneously contacted by the plug 212'.

The patching cords 210, 210' connect to the generator units 211 (only one of which is shown), and with the present arrangement these generator units are extremely simple. Each unit includes four circuits, one for each of the simulated networks. Following through from the contact plug 212 on the patching cord 210 each circuit comprises a jack contact 213 in series with a closed-circuit meter jack 214 for plugging in the milliammeter 5' to check the initial set-up of the circuit. The circuit then leads through a trimming resistor 215 and thence to the parallel bus jacks 217, which are of the same type as has already been described in connection with other units. The connection to the link or impedance unit 219 is made through a patching cord 220, as before. The impedance unit has already been described in connection with Fig. 10, and in this present figure only the jack connections for resistors 171, 171' and 172' are indicated. The output patching cord 221 connects with the multiple bus jack 217 of a load unit 222 which is identical in construction with the generator unit 211, and is connected by patching cords 223, 223' with a second set of current dividers 226, 226' connecting with the negative leads $4_{pr}$, $4_{px}$, $4_{qr}$ and $4_{qx}$ which form the return lines to the supply units.

It will be recognized that although the division of the total $I_p$ and $I_q$ as between the loads will be different from its division between the generators, the total of each of these components must be the same and this is positively assured by the supply of each of the components to each of the simulated networks by a single unit. The percentages by which these total currents divide as between the generators and generator and load units is not absolutely fixed by the networks shown, but is merely very closely approximate. It is for this reason that the trimmer rheostats 215 are supplied, but it will be found relatively easy to make adjustments dividing the current to the exact values desired, even though these values may be intermediate between the 10% values as approximately determined by the divider network.

The current supply and limiting units 200, etc., may be any of a number of types, and four circuits which will give the desired results are illustrated in Figs. 11 to 14 inclusive. All should preferably be used with a carefully voltage-regulated power supply, and all are A. C. excited.

Figure 11:
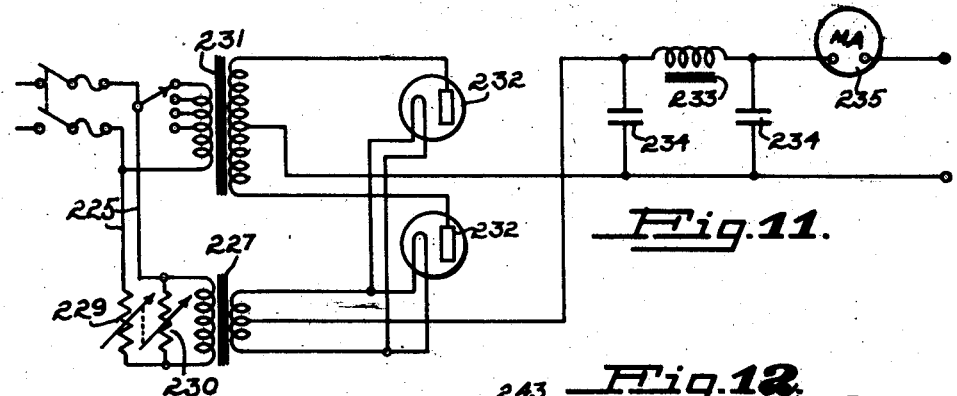
Figs. 11, 12, 13 and 14 represent respectively various types of unit for supplying constant direct current to represent the total of the various generators and loads connected to the simulated networks.

The type of supply illustrated in Fig. 11 operates on the same general principle as the separate generator unit shown in Fig. 5, i. e., by operation on the saturation current from a hot cathode. Connected across supply leads 225 is a filament transformer 227, controlled by series and parallel rheostats 229 and 230 connected in the same manner as the heater control rheostats in Fig. 5. The main rectifier transformer 231 is provided with tapped primary for voltage adjustment and feeds a pair of rectifier tubes 232 whose filaments are supplied by the transformer 227. These rectifier tubes feed a filter circuit of conventional form, comprising series inductance 233 and shunt capacitors 234 in accordance with known practice. The total current is indicated by the milliammeter 235.

Figure 12:
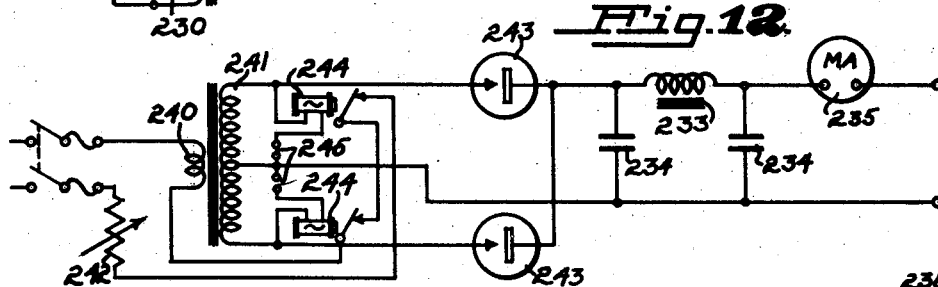

Fig. 12 shows a current supply device wherein the current transformer is utilized for limiting the current instead of tubes. The transformer may be of known type, with a primary 240 of few turns and secondary 241 of high turn ratio, the primary current being limited by a series rheostat 242. Any of the known types of rectifier 243 may be used in the output, such as copper oxide, selenium film or vacuum tube rectifiers, and the filter network and meter are the same as are shown in the preceding figures. Because dangerously high voltages may appear across the secondary when a device of this character is open-circuited, it is preferable to provide a safety device comprising circuit-breaking relays 244 in series with spark gaps 245 across each leg of the secondary, which relays open the primary circuit in case of excess voltages.

Figure 13:
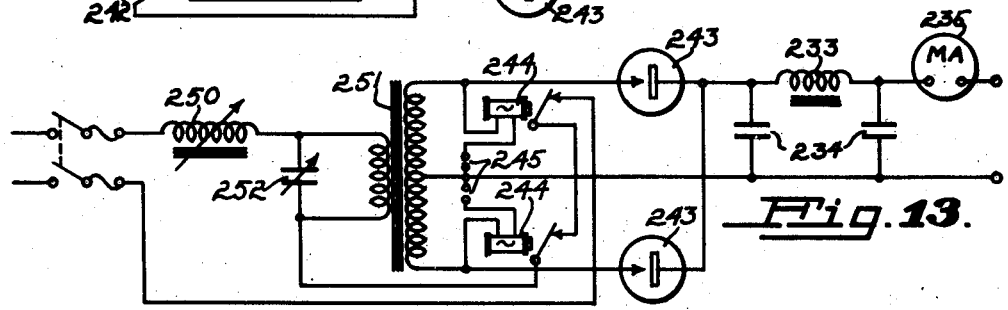

Fig. 13 shows another example of constant current supply, comprising a variable inductor 250 connected in series with the primary of the transformer 251 and a variable condenser 252 connected in parallel with this primary. When the inductor and capacitor are so set that their ohmic reactances are equal numerically, the transformer secondary will supply a substantially constant current irrespective of the impedance of the output circuit, within the limits of operation for which the device is designed. The protective relays, rectifiers, and filters are again the same as have been shown in previous figures.

Figure 14:
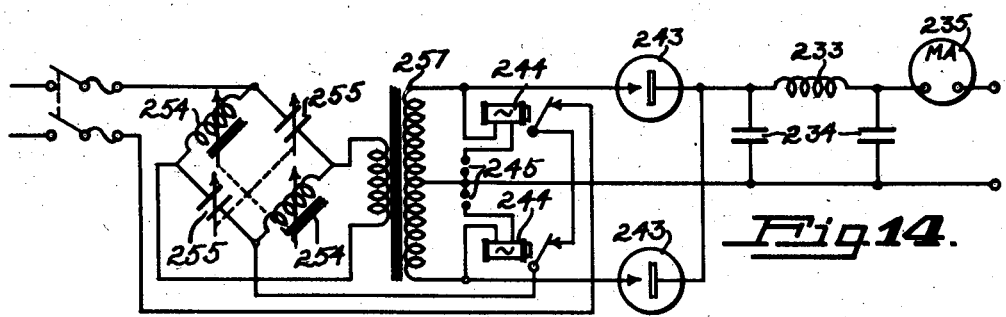

Fig. 14 shows still another constant current arrangement using capacitors and inductors. The supply lines 225 connect to opposite points on a bridge circuit comprising two equal parallel inductors 254, forming opposite arms of the bridge, and two equal variable capacitors 255 forming the other two arms of the bridge. The variable inductors are ganged together for simultaneous adjustment as are the variable condensers, and the primary of the transformer 251 is connected across the bridge. As in the cases previously discussed this will supply a substantially constant current output, and again the remainder of the circuit is constructed in the same manner as in the previous figures, and its elements are therefore indicated by the same reference characters.

Fig. 16 is a block diagram indicating the manner in which units such as those shown in Fig. 15 are connected in order to set up the simulated circuits of Fig. 1. The current supplies 200, 200' and 201, 201' are those shown in Fig. 15, while the block 270 indicates the terminal board of the current-dividing networks for supplying the various load points. Under the assumption of the original problem, generator $G_1$ applies $10/_{16}$ or $62\frac{1}{2}\%$ of the in-phase power, and generator unit 211—$G_1$ is therefore plugged at the 60% plug in the upper line of jacks, being connected thereto by a patching cord 210, while generator unit 211—$G_2$ is plugged in on the end terminal to draw the remaining 40% of the current supplied. By adjusting the trimmer units the milliammeter 5' can be made to indicate the proper current value for the respective generators. The patching cord 220 is connected between any of the output jacks of the generator unit 211—$G_1$ with any of the pairs of input jacks of impedance unit 219—A, it being understood that this patching cord is a four-conductor cable carrying all four of the simulated current components. The other link units are patched in as shown, the particular link represented by each unit being indicated by the postscript to the reference character 219, and due account being taken of the distinction between input and output terminals merely for the purpose of assuring that in metering the potential drop will be applied in the right direction. The load units 222 (distinguished by their proper postscripts) are identical in structure with the generator units, with the exception that their input and output terminals are transposed, with respect to the direction of current flow, in making the connections, and that the output terminals connect with the terminal board 271 of the current-divider attached to the negative leads of the supply units 200 and 201.

The connections of the supply units 200' and 201' are similarly made with the lower row of jacks on the terminal board 270, but in this instance it should be noted that a portion of the total reactive current is supplied by the synchronous condenser $G_3$ which furnishes no real power, and therefore the unit 211—$G_3$ has no connection with the upper row of jacks which carry the simulated currents for in-phase drop and the output of this generator is patched directly into the input of load unit 222—D in parallel with its connection to the remainder of the simulated network. Discrepancies in the actual distribution of the load as between the arbitrary 10% division supplied by the current dividers are taken care of by the trimmer rheostats in each case, as is the case of the generators.

Figure 9:
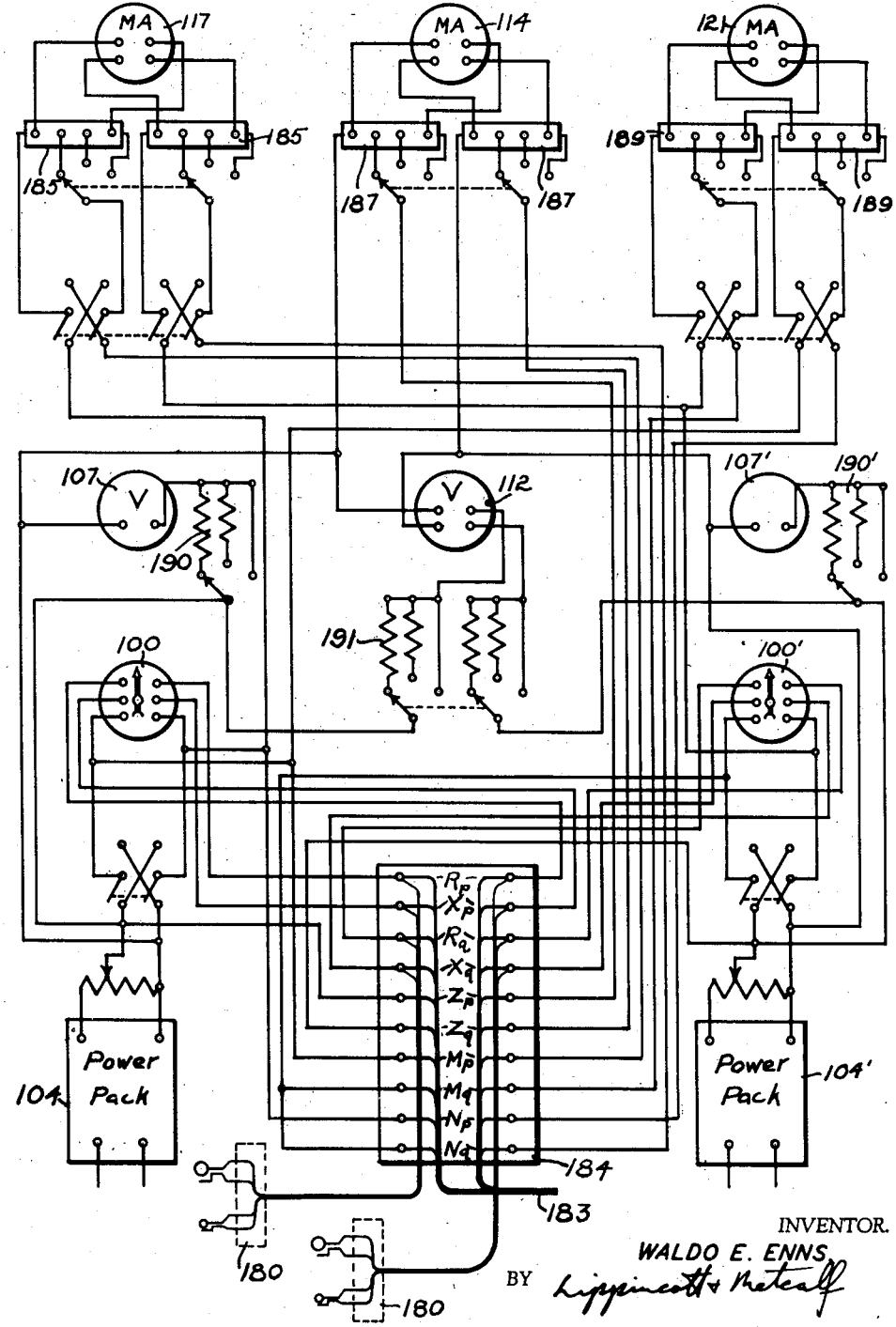
Fig. 9 is a circuit diagram of the metering system shown in Fig. 6, including connections for plugging into the circuit units of a complete circuit analyzer embodying this invention.

Since Fig. 16 is used merely to indicate the method of setting up the circuit, the metering plugs and metering circuits are not shown. As has already been stated, these are as indicated in Fig. 9 and described in connection therewith.

Figure 2:
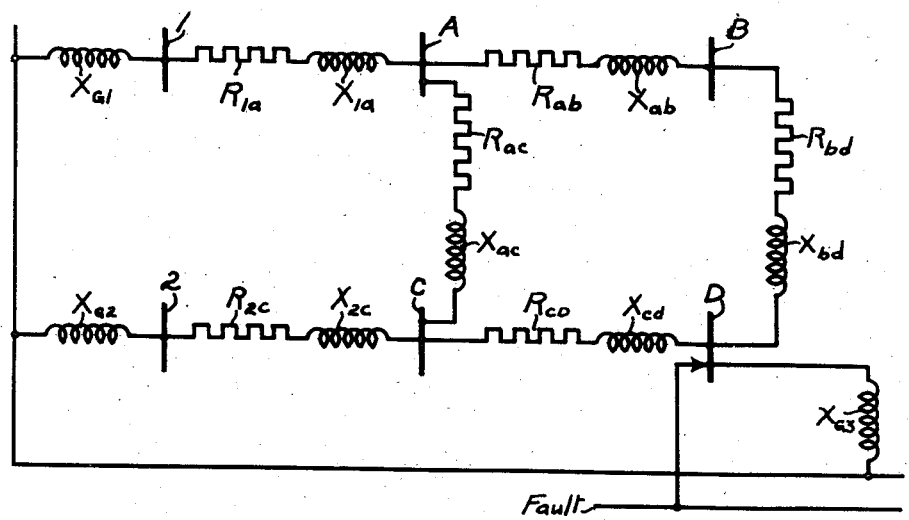
Fig. 2 is a schematic impedance diagram of the same network as considered in the analysis thereof for short-circuit conditions.

As has also been stated, the method of my invention may be used for various types of analysis, as well as for the condition of balanced three-phase circuits in normal operation. The analysis most frequently desired is that of short-circuit condition, and Fig. 2 shows the network of Fig. 1 as simplified in such a short-circuit analysis, the condition chosen being a three-phase fault on bus D. Fig. 17 indicates the set-up of the units for simulating this condition. Since the reactance of the generators is a major factor in determining the current flow, simulated reactances must be interposed at each generator point to represent the drop there occurring, and the trimmer rheostat in the generator units 211—$G_1$, 211—$G_2$ and 211—$G_3$ may be used for this purpose, or these resistors may be set to zero and additional reactive circuit units may be utilized in their stead. In the connections shown the first expedient is used.

Only the $I_q$ supply units 201, 201' are used, and the patching cord 275 connects between the 100% contact to the $I_q$ row of jacks to a bussing unit 277, consisting of a series of jacks each of which has all its terminals connected in parallel with the similar contacts of the others of the series. The input circuits of the generator units are patched in on the bussing unit 277 and thence connected to the link units in the same manner as in the previous figures. Since, however, the various loads may be considered to have infinite impedance in comparison with the impedance of the fault, only one load unit 222—D is used, and its trimmer rheostat is set at zero, this unit being used merely to complete the circuit.

The supply units 200', 201' are each set to supply a current of some definite magnitude, such as 100 milliamperes, simulating 100 amperes. The various drops around the network can then be measured and the total drop between the generator bus and the fault bus be found. Dividing the total voltage of the system by the total drop between the common generator bus and bus D with 100 amperes flowing, a factor is obtained which gives a total short-circuit current when multiplied by the assumed current of 100 amperes, and likewise gives the short-circuit current in each link when multiplied by the link currents as measured by the metering system.

In the analysis of unbalanced circuits conditions for each phase may be set up separately and the required measurements made, which will give all of the data necessary for an analysis by symmetrical components.

In the foregoing specification and in the ensuing claims effort has been made to use such terminology and reference characters as will show the interrelationship between the various parts of the various networks and the electrical quantities represented by and developed in them, and particularly to employ the terminology used in the same sense throughout. One exception to this is the term "quadrature," which it has apparently been necessary to employ in two senses. As used in the first sense the term denotes the out-of-phase component of current or voltage. In the second sense it is used to designate the relationship between the two components. It is believed that the sense in which the term is used will be clearly apparent from the context.

It should also be apparent from what has been said as to the terms "supplying" and "withdrawing" current that mathematically the two are exactly equivalent, and that "withdrawing" a current in one direction is "supplying" a current of opposite sign. The "supply" bus 3 has been shown as positive and the load or "withdrawal" bus 4 as negative, because this leads to least confusion with the usual conventions as to signs, but with proper account taken of such signs, and the drops applied in the proper directions, the functions of load and supply busses and units can be interchanged without affecting the result. Except, therefore, where the functions of supply and withdrawal are directly contrasted, to show flow in opposite senses with respect to the network as a whole, the terms are considered herein as equivalent.

I claim:

1. A network analyzer comprising a plurality of resistance units for simulating the resistances and reactances of the various links of an actual network, means for connecting said units into two simulated networks of similar configuration but with resistances proportional respectively to the resistances only and the reactances only of said actual network, current-limitng means for supplying to and withdrawing from said two networks currents proportional to the two quadrature components of current supplied to and withdrawn from said actual network, and means for simultaneously measuring and adding algebraically the voltage drops across corresponding links of said simulated networks.

2. Apparatus in accordance with claim 1 comprising switching means for transposing, with respect to each other, the electrical connections between the current limiting means and said simulated networks.

3. Apparatus in accordance with claim 1 comprising switching means for simultaneously transposing said current-limiting means with respect to said simulated networks, and reversing the sign with which one of said voltage drops is added in the measurment thereof.

4. A network analyzer comprising a plurality of resistors, means for connecting said resistors into two simulated networks of similar conformation comprising links proportional in resistance to the resistance and reactance respectively of an actual network, separate means for supplying to each of said simulated networks a total current of predetermined value, means for connecting each of said supply means to a plurality of corresponding points on each of said simulated networks, means for dividing said total predetermined currents between said plurality of points in predetermined proportions, and means for simultaneously measuring and adding algebraically the voltage drop across corresponding links of said simulated networks.

5. A network analyzer comprising means for forming two pairs of resistive networks of like conformation, the resistances of each link of the two networks forming a pair being equal, means for supplying equal predetermined currents to one network of each pair at a plurality of points and equal predetermined currents of another value to the other network of each pair at corresponding points, means for measuring the sum of the voltage drops across the corresponding links in one of the networks in each pair through which different currents are flowing, and means for measuring the difference of the voltage drops across corresponding links of the other network of each pair.

6. A network analyzer comprising means for forming two pairs of resistive networks of like conformation, the resistances of each link of the two networks forming a pair being proportional by a known factor, means for supplying predetermined currents to on network of each pair at a plurailty of points and predetermined currents of another value to the other network of each pair at corresponding points, means for measuring the sum of the voltage drops across the corresponding links in one of the networks in each pair through which different currents are flowing, and means for measuring the difference of the volatge drops across corresponding links of the other network of each pair.

WALDO E. ENNS.